(12) United States Patent
Kamihara et al.

(10) Patent No.: US 7,730,233 B2
(45) Date of Patent: *Jun. 1, 2010

(54) DATA TRANSFER CONTROL DEVICE AND ELECTRONIC INSTRUMENT

(75) Inventors: Yoshiyuki Kamihara, Sapporo (JP); Nobuharu Kobayashi, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

This patent is subject to a terminal disclaimer.

(21) Appl. No.: 11/473,120

(22) Filed: Jun. 23, 2006

(65) Prior Publication Data
US 2007/0005846 A1 Jan. 4, 2007

(30) Foreign Application Priority Data
Jun. 30, 2005 (JP) ............................. 2005-192937

(51) Int. Cl.
*G06F 13/00* (2006.01)
*G06F 13/14* (2006.01)
*G06F 13/38* (2006.01)
*G06F 15/173* (2006.01)

(52) U.S. Cl. ........................ 710/33; 710/62; 710/305; 710/316; 709/238

(58) Field of Classification Search .................. None
See application file for complete search history.

(56) References Cited

U.S. PATENT DOCUMENTS

| | | | |
|---|---|---|---|
| 5,483,642 A | 1/1996 | Okazawa et al. | |
| 5,506,973 A | 4/1996 | Okazawa et al. | |
| 5,668,956 A | 9/1997 | Okazawa et al. | |
| 5,751,976 A | 5/1998 | Okazawa et al. | |
| 5,889,971 A | 3/1999 | Okazawa et al. | |
| 5,935,231 A | 8/1999 | Okazawa et al. | |
| 5,951,667 A * | 9/1999 | Abramson ................... | 710/309 |
| 6,006,302 A | 12/1999 | Okazawa et al. | |
| 6,098,136 A | 8/2000 | Okazawa et al. | |
| 6,195,719 B1 | 2/2001 | Okazawa et al. | |
| 6,240,481 B1 | 5/2001 | Suzuki | |
| 6,334,164 B1 | 12/2001 | Okazawa et al. | |
| 6,633,933 B1 * | 10/2003 | Smith et al. ................... | 710/74 |

(Continued)

FOREIGN PATENT DOCUMENTS

CN 1549147 A 11/2004

(Continued)

OTHER PUBLICATIONS

U.S. Appl. No. 11/477,717, filed Jun. 30, 2006, Kenyou Nagao et al.

(Continued)

*Primary Examiner*—Henry W. H. Tsai
*Assistant Examiner*—Michael Sun
(74) *Attorney, Agent, or Firm*—Oliff & Berridge, PLC

(57) ABSTRACT

A data transfer control device includes an ATA device-side I/F which transfers data between the data transfer control device and an ATA host through a bus ATABUS1, an ATA host-side I/F which transfers data between the data transfer control device and an ATA device through a bus ATABUS2, a first interface which transfers data through a first bus, and a transfer controller which controls data transfer among the device-side I/F, the host-side I/F, and the first interface.

19 Claims, 15 Drawing Sheets

U.S. PATENT DOCUMENTS

| | | | |
|---|---|---|---|
| 6,810,461 B2 | 10/2004 | Okazawa et al. | |
| 6,854,045 B2 * | 2/2005 | Ooi et al. | 711/202 |
| 6,907,489 B2 | 6/2005 | Okazawa et al. | |
| 7,085,861 B2 * | 8/2006 | Chiang et al. | 710/38 |
| 7,152,130 B2 | 12/2006 | Okazawa et al. | |
| 7,219,238 B2 | 5/2007 | Saito et al. | |
| 7,346,724 B1 * | 3/2008 | Castleberry | 710/306 |
| 7,360,010 B2 * | 4/2008 | Ghaffari et al. | 710/316 |
| 7,398,346 B2 | 7/2008 | Okazawa et al. | |
| 2001/0007114 A1 | 7/2001 | Iizuka | |
| 2001/0013083 A1 | 8/2001 | Nakamura | |
| 2002/0167851 A1 | 11/2002 | Ishida et al. | |
| 2004/0167999 A1 * | 8/2004 | Fujita et al. | 710/33 |
| 2005/0027900 A1 * | 2/2005 | Pettey | 710/22 |
| 2005/0091425 A1 * | 4/2005 | Wyatt et al. | 710/33 |
| 2008/0244124 A1 | 10/2008 | Okazawa et al. | |

FOREIGN PATENT DOCUMENTS

| | | |
|---|---|---|
| JP | A-04-227557 | 8/1992 |
| JP | A-11-184800 | 7/1999 |
| JP | A-2000-172389 | 6/2000 |
| JP | A-2001-188745 | 7/2001 |
| JP | A-2001-229114 | 8/2001 |
| JP | A 2002-344537 | 11/2002 |
| JP | A-2003-281071 | 10/2003 |
| JP | A-2004-295594 | 10/2004 |
| JP | A-2005-165581 | 6/2005 |

OTHER PUBLICATIONS

U.S. Appl. No. 11/473,013, filed Jun. 23, 2006, Nobuharu Kobayashi et al.

* cited by examiner

FIG. 4A HARD WIRED MODE
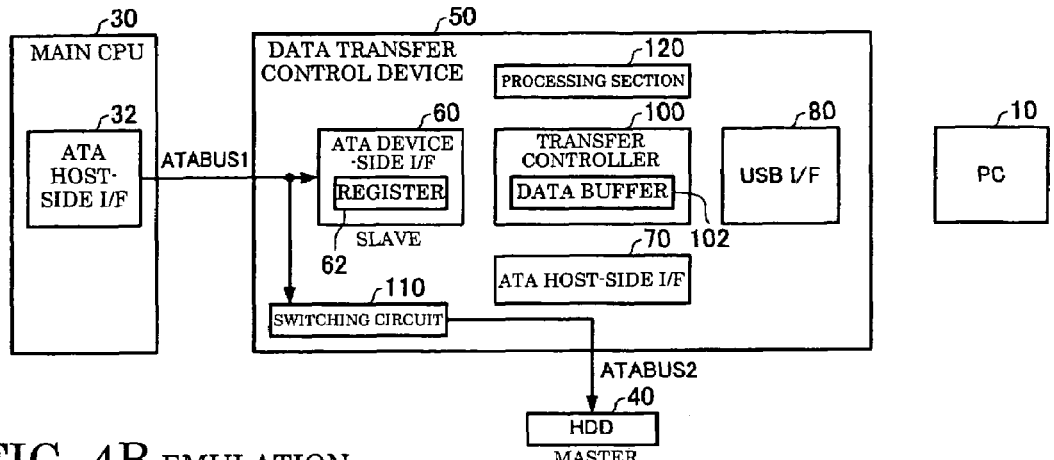
FIG. 4B EMULATION
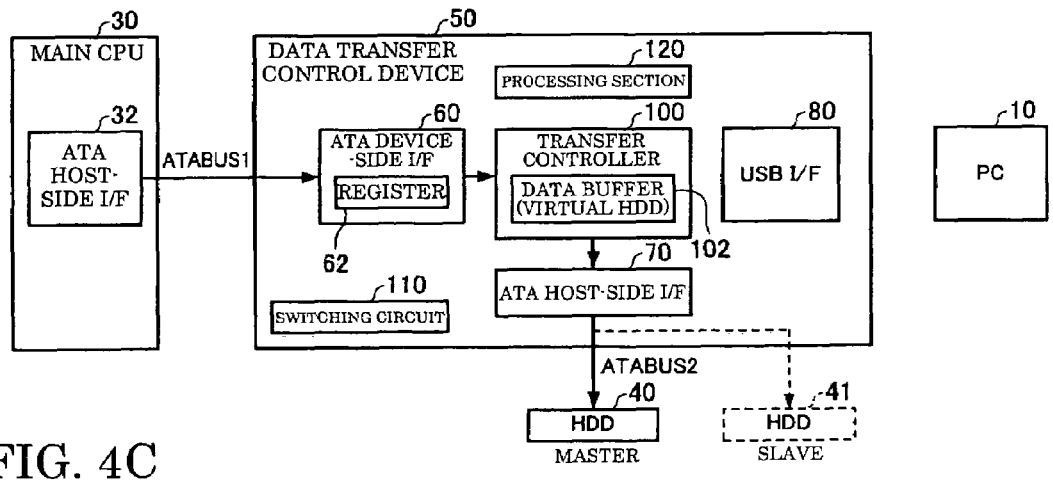
FIG. 4C
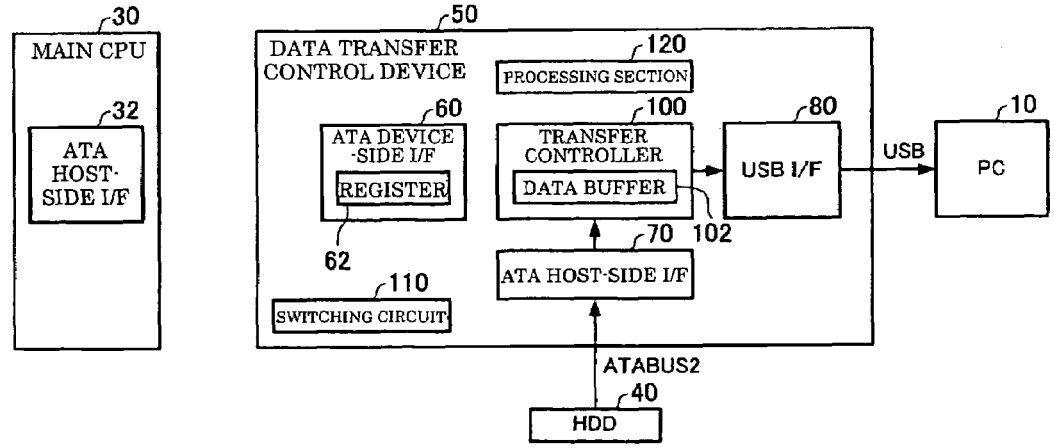

FIG. 5

| CS1(#) | CS0(#) | DA2 | DA1 | DA0 | REGISTER NAME | |
|---|---|---|---|---|---|---|
| | | | | | READ | WRITE |
| H | L | L | L | L | Data | |
| H | L | L | L | H | Error | Features |
| H | L | L | H | L | InterruptReason(ATAPI)/SectorCount(ATA) | |
| H | L | L | H | H | SectorNumber(ATA) | |
| H | L | H | L | L | ByteCountLSB(ATAPI)/CylinderLow(ATA) | |
| H | L | H | L | H | ByteCountMSB(ATAPI)/CylinderHigh(ATA) | |
| H | L | H | H | L | Device/Head ← A2 | |
| H | L | H | H | H | Status | Command ← A1 ← VENDER SPECIFIC COMMAND (80h~8Fh) |

PIO READ

PIO WRITE

DMA READ

DMA WRITE

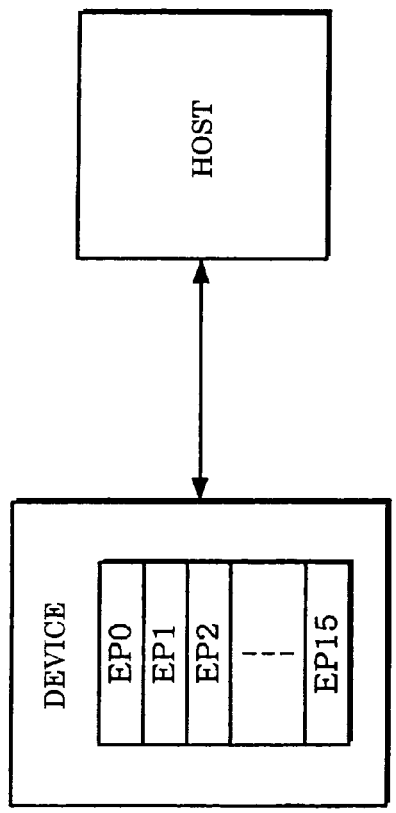
FIG. 11A
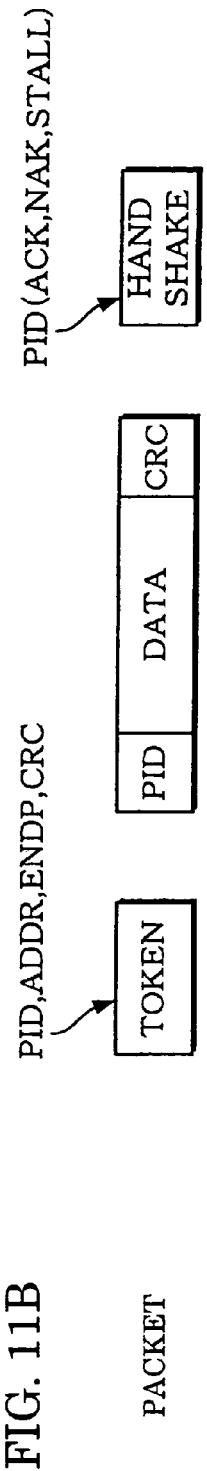
FIG. 11B PACKET
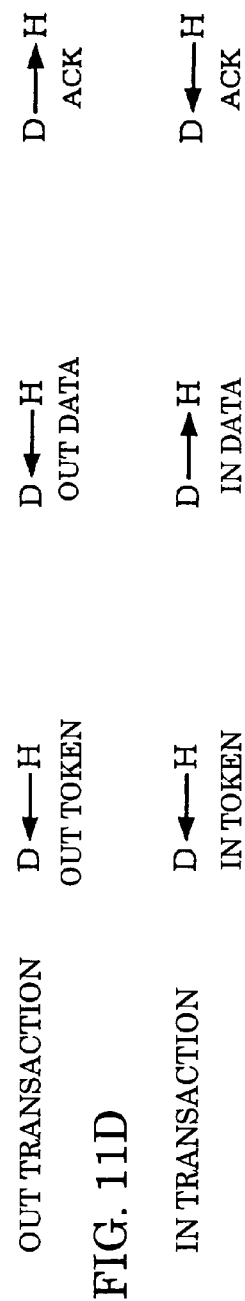
FIG. 11C OUT TRANSACTION
FIG. 11D IN TRANSACTION

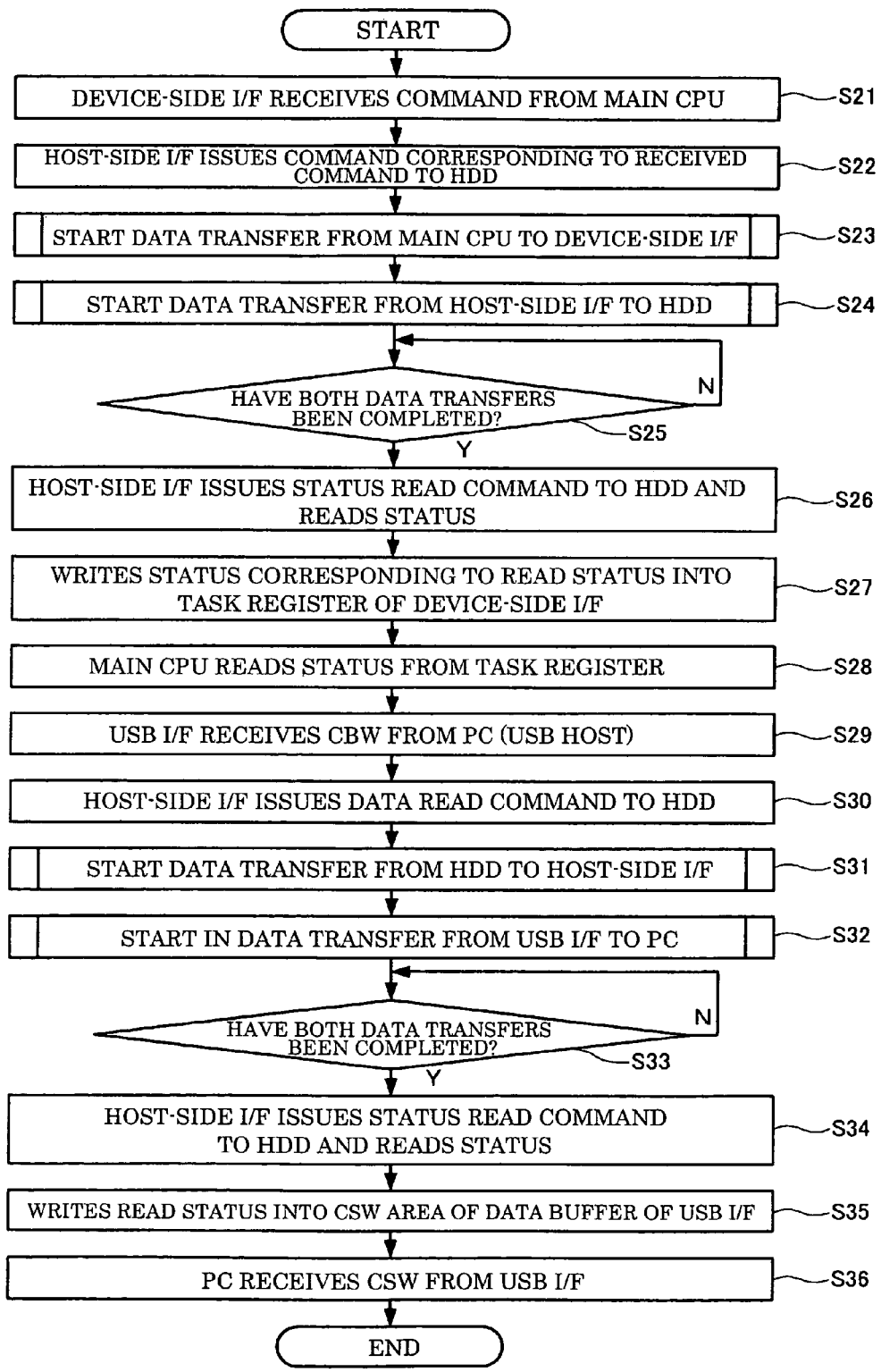

DATA TRANSFER CONTROL DEVICE AND ELECTRONIC INSTRUMENT

Japanese Patent Application No. 2005-192937 filed on Jun. 30, 2005, is hereby incorporated by reference in its entirety.

BACKGROUND OF THE INVENTION

The present invention relates to a data transfer control device and an electronic instrument.

In recent years, a high-speed serial interface standard such as the Universal Serial Bus (USB) or IEEE1394 has attracted attention. A data transfer control device has been known which has a bus bridge function between a high-speed serial interface bus (e.g. USB bus) and an AT Attachment (ATA) bus to which a storage (e.g. hard disk drive (HDD)) is connected (JP-A-2002-344537). According to such a data transfer control device, data can be written into the HDD through the USB bus at high speed, or data can be read from the HDD at high speed.

However, in such a data transfer control device, it is necessary to incorporate a USB protocol control program into firmware which operates on a main CPU of an electronic instrument. Therefore, since the designer of the electronic instrument must understand the USB protocol control to a certain extent, the design work becomes complicated, or the support business of the manufacturer of the data transfer control device becomes complicated.

A high-speed serial interface circuit such as a USB serial interface circuit may be incorporated as an Intellectual Property (IP) core depending on the type of main CPU.

However, an analog circuit (physical layer circuit) for transmitting and receiving data at high speed is provided in the high-speed serial interface circuit, and may decrease the yield of the main CPU. Moreover, since the circuit design of the high-speed analog circuit is difficult and requires know-how, a situation may occur in which the transfer rate provided in the standard cannot be realized, whereby data cannot be written into or read from the HDD at high speed.

SUMMARY

A first aspect of the invention relates to a data transfer control device comprising:

an ATA device-side interface which transfers data between the data transfer control device and an ATA host through a first ATA bus;

an ATA host-side interface which transfers data between the data transfer control device and an ATA device through a second ATA bus;

a first interface which transfers data through a first bus; and a transfer controller which controls data transfer among the device-side interface, the host-side interface, and the first interface.

A second aspect of the invention relates to an electronic instrument comprising:

the above data transfer control device;

the ATA host connected with the data transfer control device through the first ATA bus; and the ATA device connected with the data transfer control device through the second ATA bus.

BRIEF DESCRIPTION OF THE SEVERAL VIEWS OF THE DRAWING

FIGS. 4A, 4B, and 4C are diagrams illustrative of the operation according to one embodiment of the invention.

FIG. 5 is a diagram illustrative of an ATA register.

FIGS. 11A, 11B, 11C, and 11D are diagrams illustrative of USB data transfer.

FIG. 15 is another flowchart illustrative of a detailed operation according to one embodiment of the invention.

DETAILED DESCRIPTION OF THE EMBODIMENT

Figure 1A:
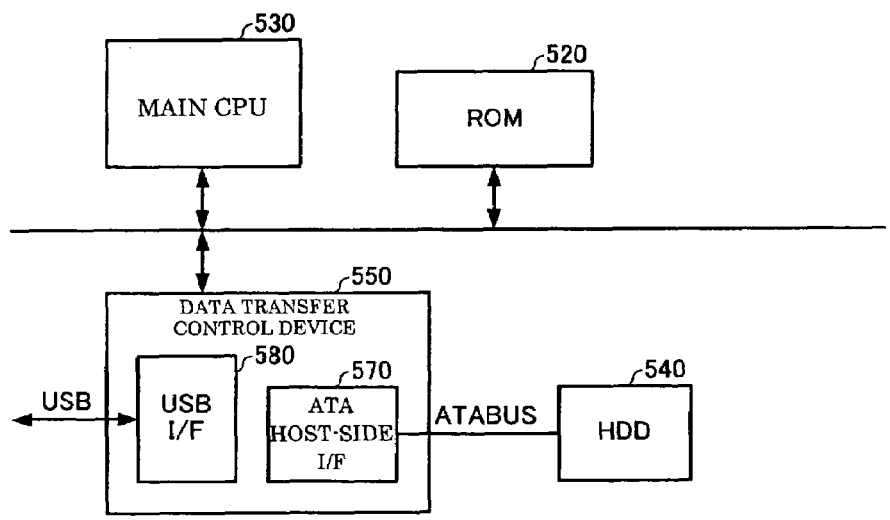
FIGS. 1A and 1B are diagrams illustrative of first and second comparative examples.

The invention may provide a data transfer control device which provides various interfaces to an ATA host, and an electronic instrument including the same.

One embodiment of the invention relates to a data transfer control device comprising:

an ATA device-side interface which transfers data between the data transfer control device and an ATA host through a first ATA bus;

an ATA host-side interface which transfers data between the data transfer control device and an ATA device through a second ATA bus;

a first interface which transfers data through a first bus; and a transfer controller which controls data transfer among the device-side interface, the host-side interface, and the first interface.

According to this embodiment, since data can be transferred between the data transfer control device and the ATA host through the first ATA bus, the first ATA bus can be used as an interface bus between the ATA host and the data transfer control device. Data from the ATA host can be transferred to the ATA device or data from the ATA device can be transferred to a host or a device connected with the first bus based on the data transfer control by the transfer controller while communicating with the ATA host through the first ATA bus. Specifically, this embodiment allows various interfaces to be provided to the ATA host by effectively utilizing the first ATA bus.

The data transfer control device according to this embodiment may comprise: a register into which a command issued by the ATA host is written through the first ATA bus; wherein the transfer controller may control so that data is transferred between two interfaces among the device-side interface, the host-side interface, and the first interface based on the command written into the register.

This allows the ATA host to control the data transfer of the transfer controller by merely writing the command into the register through the first ATA bus. Therefore, various interfaces can be provided to the ATA host without increasing the processing load of the ATA host to a large extent.

In the data transfer control device according to this embodiment, the register may be a task register included in the device-side interface.

This allows the ATA host to set various commands in the register (ATA task register) by a method conforming to the ATA standard, whereby the processing of the ATA host can be simplified and the processing load can be reduced.

In the data transfer control device according to this embodiment, when a transfer control command assigned to a vender specific command has been written into the register, the transfer controller may control so that data is transferred between two interfaces among the device-side interface, the host-side interface, and the first interface based on the written vender specific transfer control command.

This allows the ATA host to control the data transfer of the transfer controller by utilizing the transfer control command assigned to the vender specific command in the ATA standard.

The data transfer control device according to this embodiment may comprise an event notification section for notifying the ATA host of occurrence of an event.

This allows the ATA host to be notified of an event which has occurred in the data transfer control device, whereby the management and control of the ATA host can be simplified.

In the data transfer control device according to this embodiment, the event notification section may notify the ATA host of an event which has occurred relating to the first interface.

This allows the ATA host to be notified of occurrence of an event such as an event in which a host or a device is connected with the first bus, whereby the management and control of the ATA host can be simplified.

The data transfer control device according to this embodiment may comprise: a switching circuit including first to Nth switching elements which connect or disconnect first to Nth signal lines of the first ATA bus and first to Nth signal lines of the second ATA bus; wherein the first to Nth switching elements may connect the first to Nth signal lines of the first ATA bus and the first to Nth signal lines of the second ATA bus in a hard wired mode.

This allows the ATA host to access the ATA device as if the ATA device were directly connected with a host-side interface of the ATA host.

The data transfer control device according to this embodiment may comprise a processing section which performs emulation processing for transferring data between the ATA host and the ATA device through the first and second ATA buses.

This allows data transfer in various forms to be realized between the ATA host and the ATA device or between the ATA device and a host or a device connected with the first bus, whereby various types of data transfer can be realized.

In the data transfer control device according to this embodiment, the processing section may perform protocol control processing of data transfer through the first bus.

This makes it unnecessary for the ATA host to perform the protocol control processing of data transfer through the first bus, whereby the processing load of the ATA host can be reduced.

In the data transfer control device according to this embodiment, the transfer controller may transfer data read from the ATA device through the host-side interface to the first interface; and the first interface may transmit the transferred data to a host or a device connected with the first bus through the first bus.

This allows data from the ATA device to be efficiently transferred to the host or the device connected with the first bus.

The data transfer control device according to this embodiment may comprise: an ATA second host-side interface which transfers data between the data transfer control device and an ATA device through a third ATA bus; wherein the transfer controller may control data transfer among the device-side interface, the host-side interface, the second host-side interface, and the first interface.

This realizes data transfer between the ATA host and two or more ATA devices or data transfer between two or more ATA devices.

In the data transfer control device according to this embodiment, the first interface may include a physical layer circuit which at least either receives or transmits data through a serial bus.

In the data transfer control device according to this embodiment, the first bus may be a Universal Serial Bus (USB) bus, and the first interface may be a USB interface.

The data transfer control device according to this embodiment may comprise: first to Kth (K≧2) interfaces which transfer data through first to Kth buses; wherein the transfer controller may control data transfer among the device-side interface, the host-side interface, and the first to Kth interfaces.

This enables provision of a data transfer control device in which various interfaces can be easily incorporated.

Another embodiment of the invention relates to an electronic instrument comprising:

the above data transfer control device;

the ATA host connected with the data transfer control device through the first ATA bus; and the ATA device connected with the data transfer control device through the second ATA bus.

The embodiments of the invention are described below in detail. Note that the embodiments described below do not in any way limit the scope of the invention laid out in the claims. Note that all elements of the embodiments described below should not necessarily be taken as essential requirements for the invention.

1. Comparative Example

Figure 1B:
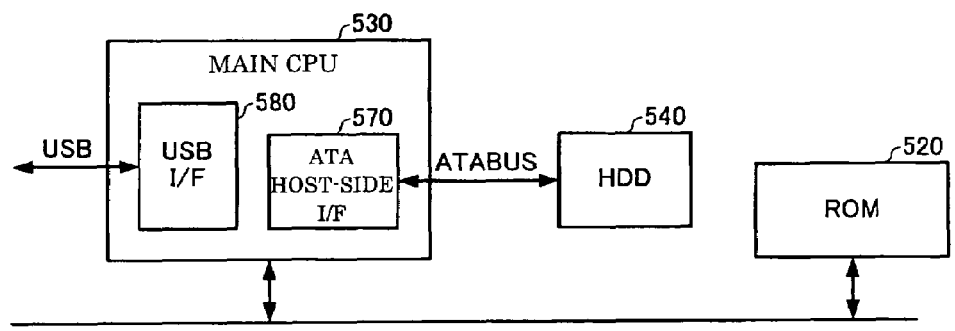

FIGS. 1A and 1B show comparative examples of one embodiment of the invention. In a first comparative example shown in FIG. 1A, a data transfer control device 550 includes an AT Attachment (ATA) host-side interface (I/F) 570 and a Universal Serial Bus (USB) I/F 580. According to the first comparative example shown in FIG. 1A, data transferred through a USB bus can be written into a hard disk drive (HDD) 540 or data written into the HDD 540 can be transferred to a personal computer (PC) or the like through the USB bus, whereby a conversion bridge function between the ATA bus and the USB bus can be realized.

In the first comparative example, the data transfer control device 550 operates under control of a main CPU 530. Therefore, it is necessary to incorporate a USB protocol control program into firmware (software) which is stored in a ROM 520 (masked ROM or EEPROM) and operates on the main CPU 530.

However, since the USB protocol control is complicated, the design work becomes complicated if the designer of electronic instruments must understand the protocol control. Moreover, it is necessary for the manufacturer of the data transfer control device 550 to provide description of the protocol control or to support the user when malfunction occurs, whereby the support business becomes complicated.

These problems also occur when developing the data transfer control device 550 into which an interface (e.g. IEEE1394 or Serial ATA) other than the USB interface is incorporated, whereby functional expansion and product development of the data transfer control device 550 are limited.

In a second comparative example shown in FIG. 1B, the USB I/F 580 is incorporated into the main CPU 530 as an IP core. The main CPU 530 can directly transfer data between the main CPU 530 and a USB host through the USB bus by incorporating the USB I/F 580 in the main CPU 530.

However, a high-speed physical layer analog circuit which transmits and receives data is provided in the USB I/F 580 which is a high-speed serial interface circuit using differential signals. This high-speed analog circuit is difficult to design and is easily affected by process variations. Therefore, the design and development of the main CPU 530 may result in failure or the yield may be decreased due to incorporation of the high-speed analog circuit, even if the core circuit of the main CPU 530 does not pose a problem. Moreover, since the circuit design of the USB I/F 580 requires know-how, a situation may occur in which the transfer rate provided in the USB 2.0 standard cannot be realized. As a result, data cannot be written into or read from the HDD 540 at high speed, whereby the convenience to the user is impaired.

2. Configuration

Figure 2:
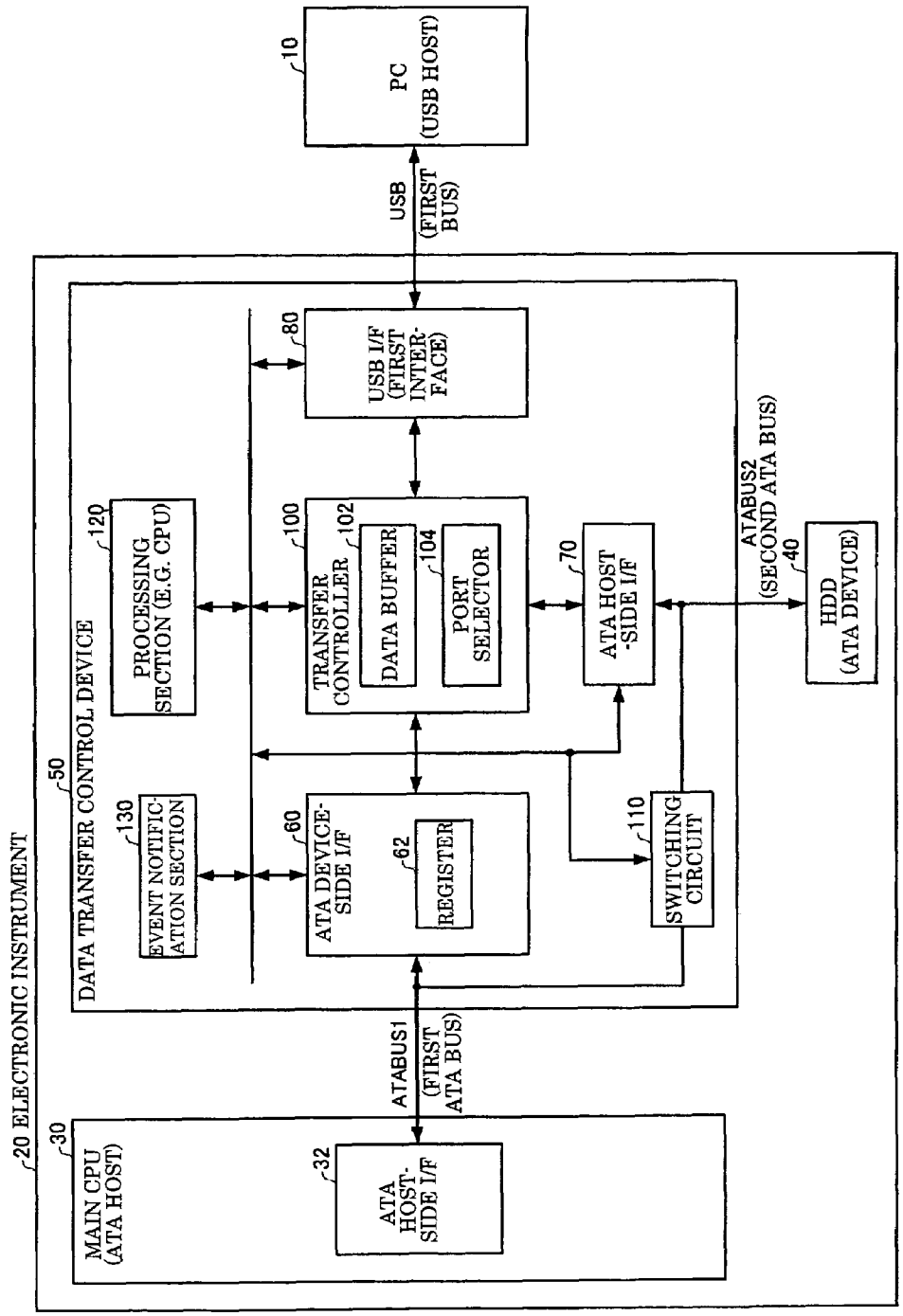
FIG. 2 is a configuration example of a data transfer control device and an electronic instrument according to one embodiment of the invention.

FIG. 2 shows a configuration example of a data transfer control device 50 according to this embodiment which can solve the above-described problems and an electronic instrument 20 including the data transfer control device 50. In this embodiment, an ATA host-side I/F 32 is included in a main CPU 30 (ATA host), and an ATA device-side I/F 60 corresponding to the host-side I/F 32 is provided in the data transfer control device 50. Specifically, the device-side I/F 60, which is not provided in the first comparative example shown in FIG. 1A, is provided. An ATA host-side I/F 70 for connecting an HDD 40 is also provided in the data transfer control device 50. Specifically, the device-side I/F 60 and the host-side I/F 70 are provided in the data transfer control device 50 (only one of the device-side I/F 60 and the host-side I/F 70 is generally provided). This enables data from the main CPU 30 to be written into the HDD 40 through the device-side I/F 60 and the host-side I/F 70. In this embodiment, a USB I/F 80 (first interface) for transferring data written into the HDD 40 to a PC 10 is also provided. This realizes the bus bridge function between the ATA bus and the USB in the same manner as in the first comparative example shown in FIG. 1A.

The configuration of the data transfer control device 50 and the electronic instrument 20 is not limited to the configuration shown in FIG. 2. Some of the elements may be omitted, the connection between the elements may be changed, or an element differing from the elements shown in FIG. 2 may be added. For example, a processing section 120, the USB I/F 80, or the like may be omitted from the data transfer control device 50. Or, the HDD 40 may be omitted from the electronic instrument 20, or an element (e.g. operation section, display section, ROM, RAM, imaging section, or power supply) other than the elements shown in FIG. 2 may be added to the electronic instrument 20.

As examples of the electronic instrument 20 according to this embodiment, a video camera, digital camera, portable music player, portable image player, optical disk drive device, hard disk drive device, audio instrument, portable telephone, portable game device, electronic notebook, electronic dictionary, portable information terminal, and the like can be given.

The electronic instrument 20 includes the main CPU 30 (main processor in a broad sense; ATA host in a broader sense), the HDD 40 (storage in a broad sense; ATA device in a broader sense), and the data transfer control device 50 (data transfer control circuit or data transfer control chip).

The main CPU 30 processes and controls the entire electronic instrument 20. For example, when the electronic instrument 20 is a video camera, the main CPU 30 functions as a camera processor, and controls an imaging device or processes image effects, image compression, and the like. The main CPU 30 includes the ATA host-side I/F (interface) 32. The host-side I/F 32 may be a CF+ interface which is switched to an ATA interface by a mode setting.

Various types of data are written into the HDD 40. For example, when the electronic instrument 20 is a video camera, captured image data is written into the HDD 40 from the main CPU 30 through the data transfer control device 50. The image data written into the HDD 40 can be transferred to the PC (personal computer) 10 through the data transfer control device 50 and the USB bus. Therefore, when the image data has been stored in the HDD 40 to its maximum storage capacity, the user can transfer the image data stored in the HDD 40 to the PC 10 and store the image data in an HDD or an optical disk provided in the PC 10, whereby the convenience to the user can be improved.

The data transfer control device 50 includes the ATA (IDE) device-side I/F 60 and the ATA host-side I/F 70. The data transfer control device 50 may also include the USB I/F 80, transfer controller 100, switching circuit 110, processing section 120, and event notification section 130.

The device-side I/F 60 is an interface for transferring data (communication) between the data transfer control device 50 and the main CPU 30 (ATA host) through a bus ATABUS1 (first ATA bus). The host-side I/F 70 is an interface for transferring data between the data transfer control device 50 and the HDD 40 (ATA device) through a bus ATABUS2 (second ATA bus). The term "ATA" in this embodiment may include the AT Attachment with Packet Interface (ATAPI). The term "ATA" may also include a standard developed from the known ATA standard, such as Serial ATA and CE-ATA. The data transfer control device 50 may include two or more ATA host-side I/Fs.

The device-side I/F 60 includes a register 62. A command issued by the main CPU 30 is written into the register 62 through the bus ATABUS1. In more detail, a task register included in the ATA device-side I/F may be used as the register 62. In this embodiment, a command assigned to a vender specific command of ATA commands is written into the register 62 (task register). The transfer controller 100 and the processing section 120 operate based on the vender specific command. For example, the transfer controller 100 determines so that data is transferred between two interfaces among the device-side I/F 60, the host-side I/F 70, and the USB I/F 80 based on a vender specific transfer control command (command which designates the transfer direction and the amount of data transferred) set in the register 62. The transfer controller 100 also determines the amount of data transferred between the interfaces. The processing section 120 determines the operation mode of the data transfer control device 50 based on a vender specific mode setting command set in the register 62. In more detail, the processing section 120 determines whether or not the operation mode has been set to a hard wired mode.

The USB I/F 80 (first interface in a broad sense) is an interface for transferring data (high-speed serial transfer) through the USB bus (first bus in a broad sense). In more detail, the USB I/F 80 includes a physical layer circuit which receives and transmits data through the USB bus (serial bus), and transfers data between the USB I/F 80 and the PC 10 (USB host in a broad sense; host in a broader sense).

When the USB I/F 80 has a host function, a USB device (device in a broad sense) may be connected with the USB bus, and data may be transferred between the USB I/F 80 and the USB device. The first interface is not limited to the USB interface, but may be an interface conforming to another standard such as IEEE1394 or Secure Digital (SD). The first interface may be Serial ATA or CE-ATA. First to Kth (K≧2) interfaces which transfer data through first to Kth buses may be provided in the data transfer control device 50. In this embodiment, the bus may be wired or wireless.

The transfer controller 100 controls data transfer among the device-side I/F 60, the host-side I/F 70, and the USB I/F 80 (first interface).

In more detail, the transfer controller 100 controls data transfer between the device-side I/F 60 and the host-side I/F 70. This allows data transferred from the main CPU 30 to be written into the HDD 40 or allows data written into the HDD 40 to be transferred to the main CPU 30. The transfer controller 100 also controls data transfer between the host-side I/F 70 and the USB I/F 80. This allows data written into the HDD 40 to be transferred to the PC 10 through the USB bus or allows data transferred from the PC 10 to be written into the HDD 40. The transfer controller 100 also controls data transfer between the device-side I/F 60 and the USB I/F 80. This allows data transferred from the main CPU 30 to be transferred to the PC 10 through the USB bus or allows data transferred from the PC 10 to be transferred to the main CPU 30.

The transfer controller 100 controls (determines) so that data is transferred between two interfaces among the device-side I/F 60, the host-side I/F 70, and the USB I/F 80 based on a command written into the register 62.

The transfer controller 100 includes a data buffer 102 (e.g. FIFO). The data buffer 102 is a buffer for temporarily storing data transferred by the transfer controller 100. The data buffer 102 may be realized by a memory such as a RAM.

The transfer controller 100 includes a port selector 104. The port selector 104 is a circuit for selecting interfaces between which data is transferred from the device-side I/F 60, the host-side I/F 70, and the USB I/F 80 (first to Kth interfaces) connected with ports of the transfer controller 100. For example, when transferring data between the device-side I/F 60 and the host-side I/F 70, the port selector 104 selects the port of the device-side I/F 60 and the port of the host-side I/F 70 so that data is transferred between these ports. When transferring data between the host-side I/F 70 and the USB I/F 80, the port selector 104 selects the port of the host-side I/F 70 and the port of the USB I/F 80 so that data is transferred between these ports.

The switching circuit 110 is a circuit which connects or disconnects the bus ATABUS1 and the bus ATABUS2. In more detail, the switching circuit 110 includes first to Nth (N≧2) switching elements which respectively connect or disconnect first to Nth signal lines of the bus ATABUS1 and first to Nth signal lines of the bus ATABUS2. The first to Nth signal lines are signal lines for signals CS[1:0], DA[2:0], DD[15:0], DASP, DIOR, DIOW, DMACK, DMARQ, INTRQ, IORDY, PDIAQ RESET, and the like. The first to Nth switching elements respectively connect the first to Nth signal lines of the bus ATABUS1 and the first to Nth signal lines of the bus ATABUS2 in the hard wired mode. This allows the host-side I/F 32 (ATABUS1) of the main CPU 30 and the HDD 40 (ATABUS2) to be directly connected, whereby the hard wired mode can be realized. The first to Nth switching elements of the switching circuit 110 are ON/OFF controlled based on switching signals from the processing section 120 (switching signal generation section), for example.

The processing section 120 processes and controls the entire data transfer control device 50 and controls each circuit block included in the data transfer control device 50. The function of the processing section 120 may be partially or entirely implemented by a CPU and firmware which operates on the CPU or may be implemented by a dedicated hardware circuit.

In more detail, the processing section 120 performs emulation processing for transferring data between the main CPU 30 (ATA host) and the HDD 40 (ATA device) through the buses ATABUS1 and ATABUS2. The processing section 120 also controls the switching circuit 110. When the processing section 120 has determined that the data transfer control device 50 has been set in the hard wired mode, the processing section 120 turns ON the first to Nth switching elements of the switching circuit 110 to connect the first to Nth signal lines of the bus ATABUS1 and the first to Nth signal lines of the bus ATABUS2. The processing section 120 also performs USB protocol control processing through the USB bus (protocol control processing of data transfer through the first bus in a broad sense).

Note that the processing section 120 may not be provided in the data transfer control device 50, and a CPU I/F which interfaces between the data transfer control device 50 and the main CPU 30 may be provided. In this case, the main CPU 30 controls the data transfer control device 50 and each circuit block included in the data transfer control device 50 through the CPU I/F.

A program for causing the processing section 120 to operate may be stored in a memory (e.g. EEPROM) of the main CPU 30. In this case, the main CPU 30 may issue a download command after power has been supplied to the data transfer control device 50, and the program may be downloaded to the data transfer control device 50 (memory included in the data transfer control device) through the bus ATABUS1.

The event notification section 130 (event notification circuit) notifies the main CPU 30 (ATA host) of occurrence of an event. In more detail, the event notification section 130 notifies the main CPU 30 of an event which has occurred relating to the USB I/F 80 (first interface). For example, when the PC 10 has been connected with the USB bus, the event notification section 130 informs the main CPU 30 of this connection. Or, when an error has occurred during data transfer of the transfer controller 100, the event notification section 130 notifies the main CPU 30 of occurrence of the error. Or, when an ATA (ATAPI) device connected with the bus ATABUS2 is an optical disk drive and an optical disk is loaded into the optical disk drive, the event notification section 130 notifies the main CPU 30 that the optical disk has been loaded.

In this embodiment, the main CPU 30 and the data transfer control device 50 are interfaced through the bus ATABUS1. Therefore, while the main CPU 30 can be notified of occurrence of an event relating to ATA data transfer through the bus ATABUS1, it is difficult to notify the main CPU 30 of occurrence of other events.

However, the main CPU 30 can be notified of occurrence of an event other than an event relating to ATA data transfer by providing the event notification section 130 shown in FIG. 2.

Note that the main CPU 30 may be notified of occurrence of an event using an interrupt signal line or the like provided separately from the signal line of the bus ATABUS1. Or, when the host-side I/F 32 of the main CPU 30 is a CF+ I/F, the main CPU 30 may be notified of occurrence of an event using a signal line connected with a terminal (e.g. card detection terminal CD) which is not used in the ATA mode.

3. Modification

Figure 3A:
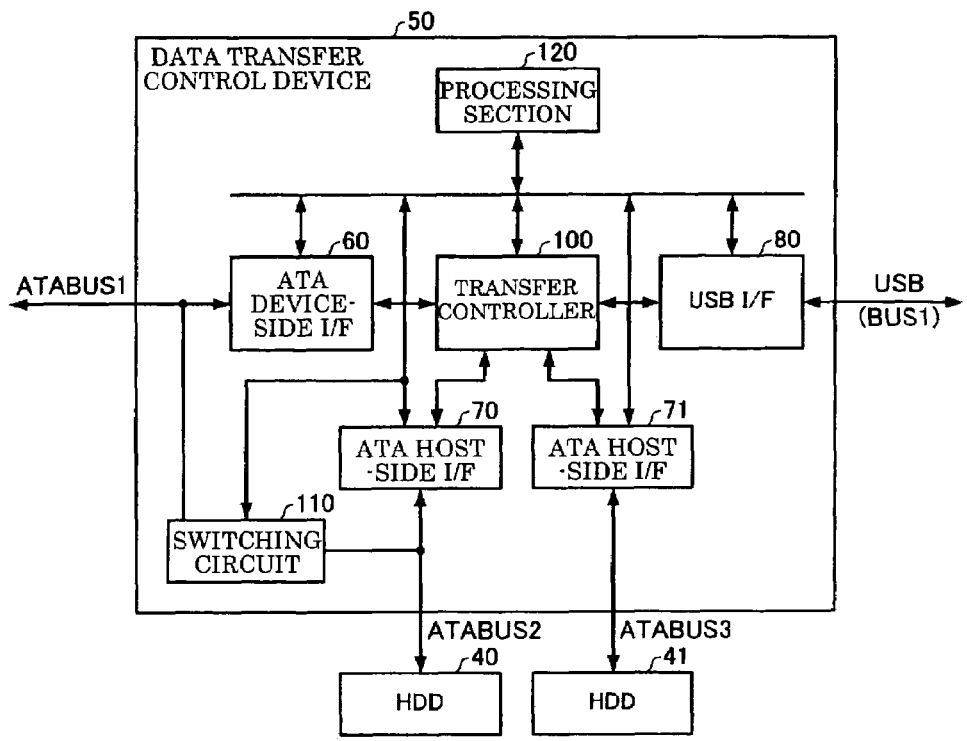
FIGS. 3A and 3B are modifications according to one embodiment of the invention.
Figure 3B:
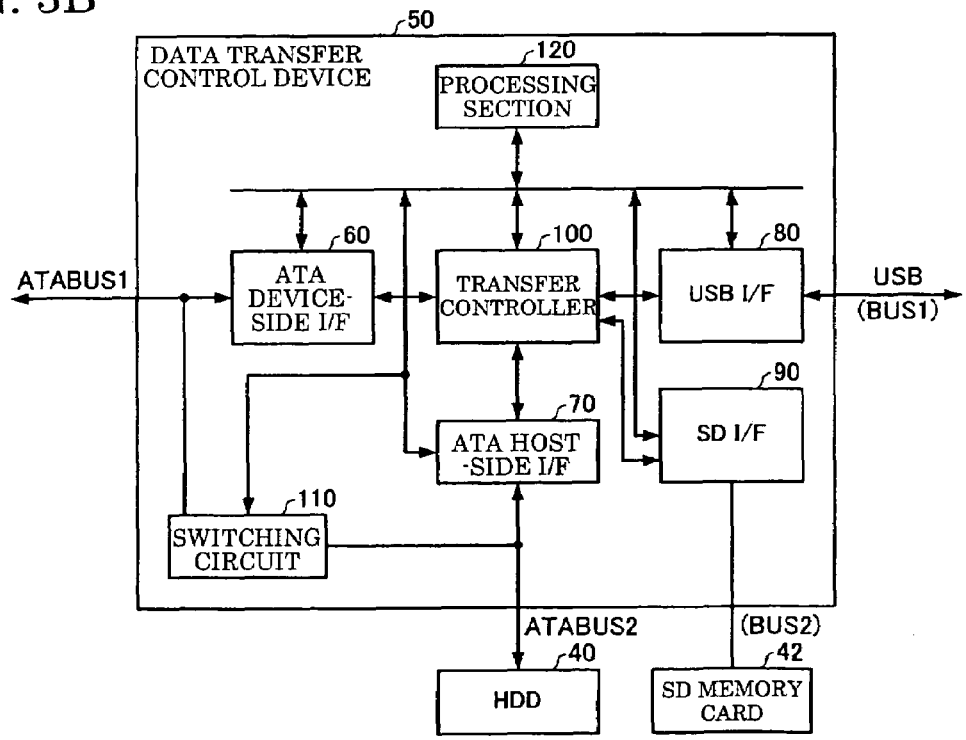

FIGS. 3A and 3B show modifications of the data transfer control device 50 according to this embodiment. In FIG. 3A, the data transfer control device 50 includes an ATA second host-side I/F 71 which transfers data between the data transfer control device 50 and an HDD 41 (ATA device) through a bus ATABUS3 (third ATA bus), for example. The transfer controller 100 controls data transfer among the device-side I/F 60, the host-side I/F 70, the second host-side I/F 71, and the USB I/F 80.

According to the configuration shown in FIG. 3A, two HDDs 40 and 41 can be connected with the data transfer control device 50. For example, data written into the HDD 41 can be transferred to the PC 10 through the USB I/F 80 in a period in which data from the main CPU 30 is written into the HDD 40. Moreover, data written into the HDD 40 can be transferred to and written into the HDD 41, or data written into the HDD 41 can be transferred to and written into the HDD 40. Although FIG. 3A shows an example in which two host-side I/Fs 70 and 71 are provided, three or more host-side I/Fs may be provided.

In FIG. 3B, an SD I/F 90 for a Secure Digital (SD) memory card is provided in addition to the USB I/F 80 to realize an SD interface having a Content Protection for Recordable Media (CPRM) function. In FIG. 3B, the data transfer control device 50 includes the USB I/F 80 and the SD I/F 90 (first to Kth interfaces in a broad sense) which transfer data through buses BUS1 and BUS2 (first to Kth buses in a broad sense). The transfer controller 100 controls data transfer among the device-side I/F 60, the host-side I/F 70, the USB I/F 80, and the SD I/F 90. Therefore, data from the main CPU 30 can be written into an SD memory card 42, or data written into the SD memory card 42 can be transferred to the PC 10 through the USB I/F 80, for example. Or, data written into the HDD 40 can be written into the SD memory card 42.

In this embodiment, the first to Kth interfaces provided in the data transfer control device 50 are not limited to the USB and SD interfaces. For example, various interfaces such as IEEE1394, Serial ATA, and CE-ATA interfaces may be employed. Specifically, various interfaces including a physical layer circuit which at least either receives or transmits data through a serial bus or the like may be provided as the first to Kth interfaces.

4. Operation

The operation according to this embodiment is described below with reference to FIGS. 4A, 4B, and 4C. In this embodiment, the hard wired mode is realized by providing the switching circuit 110. In the hard wired mode, as shown in FIG. 4A, the switching elements included in the switching circuit 110 are turned ON, whereby the signal lines (first to Nth signal lines) of the bus ATABUS1 are connected with the signal lines (first to Nth signal lines) of the bus ATABUS2. As a result, the host-side I/F 32 of the main CPU 30 is directly connected with the HDD 40 (device-side I/F included in the HDD 40). Therefore, the main CPU 30 can directly write data into the HDD 40 or directly read data from the HDD 40. Moreover, since the buses ATABUS1 and ATABUS2 are directly connected, data can be written or read at high speed.

The hard wired mode may be set based on the mode setting command issued by the main CPU 30 and written into the register 62 through the bus ATABUS1, for example. In more detail, when the mode setting command which sets the operation mode to the hard wired mode has been written into the register 62, the processing section 120 controls the switching signals based on the mode setting command. The processing section 120 turns ON the switching elements included in the switching circuit 110, thereby connecting the signal lines of the bus ATABUS1 and the signal lines of the bus ATABUS2.

In this case, the ATA task register included in the device-side I/F 60 may be used as the register 62. FIG. 5 shows an example of an ATA register configuration. FIG. 5 shows command block registers of which the addresses are selected when chip select signals CS1 and CS0 (# indicates negative logic) are set at the H level and the L level, respectively. In FIG. 5, when the chip select signals CS1 and CS0 and address signals DA2, DA1, and DA0 are set at the H level, L level, H level, H level, and H level, respectively, and the host writes data into a register, a Command register indicated by A1 is accessed. Commands written into the Command register and having a command code of 80h to 8Fh are provided as vender specific commands which can be arbitrarily defined by the vender (manufacturer). In this embodiment, the hard wired mode may be set using the vender specific mode setting command.

In this embodiment, the register 62 operates as an ATA slave and the HDD 40 operates as a master with respect to the main CPU 30, for example. Note that the register 62 may operate as a master and the HDD 40 may operate as a slave.

In more detail, whether the command block from the main CPU 30 is the slave command block or the master command block can be determined by a DEV bit (device select bit) of a Device/Head register indicated by A2 in FIG. 5. When the main CPU 30 has set the DEV bit to the slave side and issued the vender specific mode setting command, the processing section 120 refers to the DEV bit to determine that the destination of the command is the processing section 120. When the hard wired mode has been enabled based on the mode setting command, the processing section 120 turns ON the switching elements of the switching circuit 110 to connect the signal lines of the bus ATABUS1 and the signal lines of the bus ATABUS2, whereby the ATA host-side I/F 32 and the HDD 40 are directly connected.

When the main CPU 30 has set the DEV bit to the master side and transferred data, the HDD 40 refers to the DEV bit to determine that the destination of the data is the HDD 40, and writes the data into a hard disk provided therein.

When the main CPU 30 has set the DEV bit to the slave side and issued the mode setting command which disables the hard wired mode, the processing section 120 turns OFF the switching elements of the switching circuit 110. This causes the signal lines of the bus ATABUS1 and the signal lines of the bus ATABUS2 to be disconnected, whereby the hard wired mode is cancelled.

The main CPU 30 can write or read data into or from the HDD 40 at high speed as if the HDD 40 were directly connected with the bus ATABUS1 by using the hard wired mode as shown in FIG. 4A.

In this embodiment, as shown in FIG. 4B, the processing section 120 performs the emulation processing for transferring data between the main CPU 30 (ATA host) and the HDD 40 (ATA device) through the buses ATABUS1 and ATABUS2.

In more detail, when the device-side IF 60 has received the command from the main CPU 30 through the bus ATABUS1, the processing section 120 issues a command corresponding to the received command (received command or command obtained by converting the received command) to the HDD 40 through the host-side I/F 70 and the bus ATABUS2. Specifically, the processing section 120 causes the ATA host-side I/F 70 to issue the command.

After issuing the command, the processing section 120 starts data transfer through the bus ATABUS1, the device-side I/F 60, the host-side I/F 70, and the bus ATABUS2. In FIG.

4B, data from the main CPU 30 is transferred to and written into the data buffer 102 which functions as a virtual HDD through the bus ATABUS1 and the device-side I/F 60, for example. The data written into the data buffer 102 is transferred to and written into the HDD 40 through the host-side I/F 70 and the bus ATABUS2.

When the host-side I/F 70 has read the status from the HDD 40 through the bus ATABUS2 after completion of the data transfer, the processing section 120 returns a status corresponding to the read status (read status or status obtained by converting the read status) to the main CPU 30 through the device-side I/F 60 and the bus ATABUS1.

The emulation processing shown in FIG. 4B allows various types of data transfer which cannot be realized in the hard wired mode, although the transfer rate is decreased in comparison with the hard wired mode shown in FIG. 4A.

For example, since the register 62 operates as a slave (or master) in the hard wired mode shown in FIG. 4A, only one master (or slave) HDD 40 can be connected. On the other hand, the emulation processing shown in FIG. 4B eliminates such a restriction and allows connection of two master and slave HDDs 40 and 41.

In FIG. 4B, the main CPU 30 issues a vender specific write command and writes it into the register 62 to write data into the data buffer 102 which functions as the virtual HDD. The processing section 120 analyzes the vender specific write command.

When the processing section 120 has determined that the destination of the data is the master-side HDD 40 based on the analysis result, the host-side I/F 70 issues an ATA write command in which the DEV bit is set to the master side to output the data stored in the data buffer 102 to the bus ATABUS2. Then, the master-side HDD 40 receives the data and writes it into the hard disk.

On the other hand, when the processing section 120 has determined that the destination of the data is the slave-side HDD 41 based on the analysis result, the host-side I/F 70 issues an ATA write command in which the DEV bit is set to the slave side to output the data stored in the data buffer 102 to the bus ATABUS2. Then, the slave-side HDD 41 receives the data and writes it into the hard disk. Two HDDs 40 and 41 can be connected with the host-side I/F 70 by utilizing the above-described emulation processing, whereby convenience can be improved.

As shown in FIG. 4C, data written into the HDD 40 in the hard wired mode or by the emulation processing can be transferred to the PC 10 through the USB bus. Specifically, the transfer controller 100 transfers data read from the HDD 40 through the host-side I/F 70 to the USB I/F 80. Then, the USB I/F 80 transmits the transferred data to the PC 10 (host or device) connected with the USB bus through the USB bus (first bus). This enables data written into the HDD 40 to be transferred to the PC 10 and stored in a HDD or an optical disk provided in the PC 10, whereby the convenience to the user can be improved.

The above-described data transfer control device 50 according to this embodiment has the following advantages over the first and second comparative examples shown in FIGS. 1A and 1B.

In the first comparative example, since it is necessary to incorporate the USB protocol control program and the like into the firmware which operates on the main CPU 530, the design work of electronic instruments and the support business become complicated.

In this embodiment shown in FIG. 2, the main CPU 30 and the data transfer control device 50 communicate through the ATA interface, and the data transfer of the data transfer control device 50 is controlled using the vender specific command written into the register 62 through the bus ATABUS1. The USB protocol control is performed by the processing section 120. This makes it unnecessary to incorporate the USB protocol control program into the firmware which operates on the main CPU 30, whereby the burden imposed on the design work of the electronic instrument 20 and the support work of the data transfer control device 50 can be reduced.

Specifically, since the designer of the electronic instrument 20 has a detailed knowledge of the ATA interface which has been commonly used, the main CPU 30 and the data transfer control device 50 can be reliably connected. For example, when transferring data stored in the HDD 40 to the PC 10 through the USB I/F 80, it suffices that the main CPU 30 issue the vender specific command which directs data transfer in this transfer direction and write the command into the register 62, and the main CPU 30 need not take part in the protocol control of the USB I/F 80. Specifically, it suffices to add a control driver for processing the vender specific command to a normal ATA driver of the firmware of the main CPU 30. Therefore, the processing load imposed on the main CPU 30 and the burden imposed on the design work of the electronic instrument 20 can be reduced. Moreover, since it suffices that the manufacturer of the data transfer control device 50 support the user for only the vender specific command and the control driver for processing the vender specific command, the burden imposed on the support business can be reduced.

This embodiment also has an advantage in that future functional expansion and product development of the data transfer control device 50 can be facilitated. For example, when the SD I/F 90 is added as one of the first to Kth interfaces as described in the modification shown in FIG. 3B, it is unnecessary to incorporate an SD protocol control program into the firmware of the main CPU 30, and the SD data transfer is realized by the vender specific command and the processing of the processing section 120. Therefore, the addition of the SD I/F 90 does not increase the burden imposed on the design work of the electronic instrument 20 and the support work of the data transfer control device 50 to a large extent. Therefore, interfaces of new standards such as SD, Serial ATA, and CE-ATA can be easily incorporated into the data transfer control device 50, whereby a wide range of functional expansion and product development of the data transfer control device 50 can be realized. Moreover, the commercial value of the data transfer control device 50 can be increased by incorporating interfaces of various new standards into the data transfer control device 50.

In the second comparative example shown in FIG. 1B, since it is necessary to incorporate a high-speed analog circuit (physical layer circuit) into the main CPU 530, the design period of the main CPU 530 is increased or the yield is decreased.

In this embodiment shown in FIG. 2, it suffices to provide the ATA host-side I/F, which has been commonly used, in the main CPU 30. Since the ATA interface can be realized by a CMOS (TTL) voltage level logic circuit, an increase in the design period of the main CPU 30 or a decrease in yield can be prevented.

The actual data transfer rate of the USB interface differs depending on the know-how of the circuit technology. On the other hand, the data transfer rate of the ATA interface does not differ to a large extent depending on the know-how of the circuit technology. Moreover, the transfer rate of the ATA interface is sufficiently high for the interface between the main CPU 30 and the data transfer control device 50. Therefore, high-speed data transfer among the main CPU 30, the HDD 40, and the PC 10 can be realized.

5. Switching Circuit

Figure 6A:
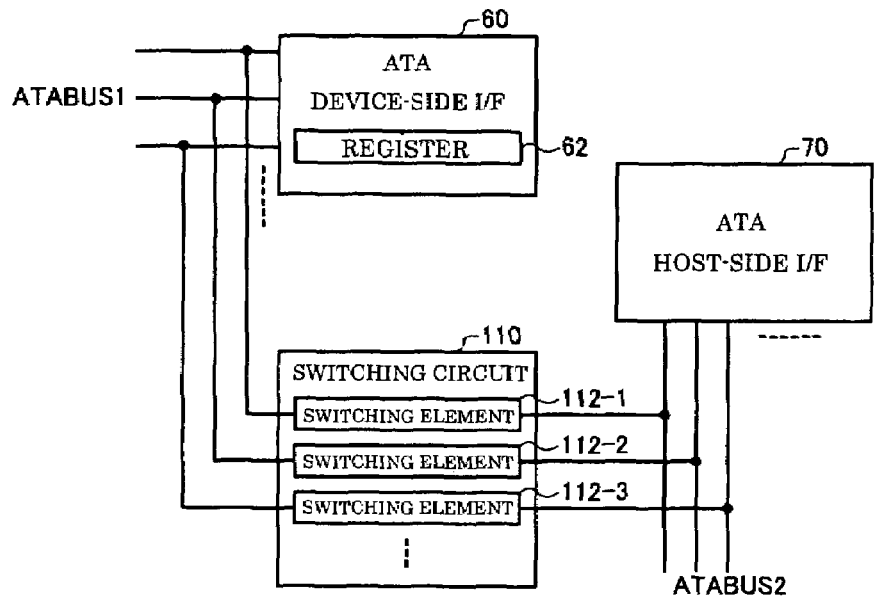
FIGS. 6A and 6B are configuration examples of a switching circuit.

FIG. 6A shows a configuration example of the switching circuit 110 according to this embodiment. As shown in FIG. 6A, the switching circuit 110 includes switching elements 112-1, 112-2, 112-3, . . . (first to Nth switching elements) which connect (conduction) or disconnect (nonconduction) the signal lines of the bus ATABUS1 and the signal lines of the bus ATABUS2. When the hard wired mode setting command has been written into the register 62 and the switching signal from the processing section 120 (switching signal generation section) has been set to active, the switching elements 112-1, 112-2, 112-3, . . . are turned ON. This allows the signal lines of the bus ATABUS1 to be connected with the signal lines of the bus ATABUS2. This realizes the hard wired mode in which the main CPU 30 can operate as if the HDD 40 is directly connected with the host-side I/F 32.

Figure 6B:
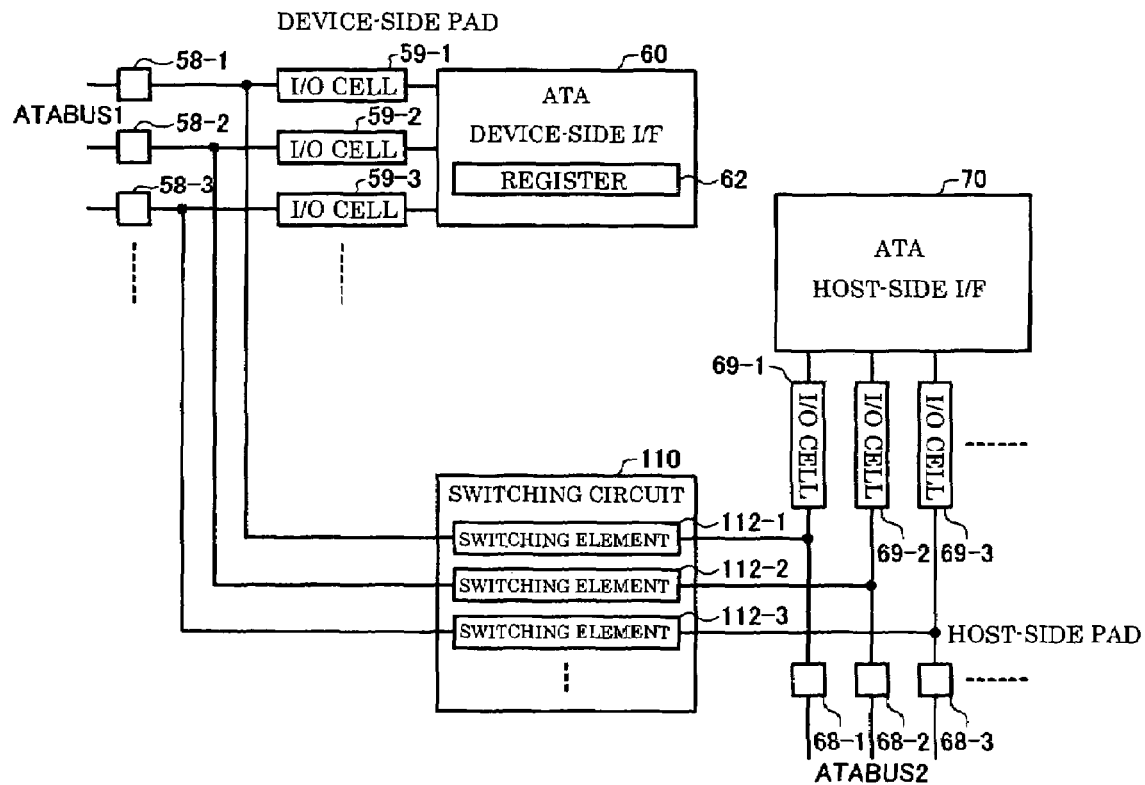

It is preferable that the switching elements 112-1, 112-2, 112-3, . . . of the switching circuit 110 have a connection configuration as shown in FIG. 6B.

In FIG. 6B, device-side pads 58-1, 58-2, 58-3, . . . (first to Nth device-side pads in a broad sense) are pads (electrodes) for the device-side I/F 60, the device-side pads 58-1, 58-2, 58-3, . . . being pads connected with the signal lines (first to Nth signal lines) of the bus ATABUS1. Specifically, the signal lines from the device-side pads 58-1, 58-2, 58-3, . . . are connected with I/O cells 59-1, 59-2, 59-3, . . . (first to Nth device-side I/O cells in a broad sense) for the device-side I/F 60.

Host-side pads 68-1, 68-2, 68-3, . . . (first to Nth host-side pads in a broad sense) are pads for the host-side I/F 70 connected with the signal lines (first to Nth signal lines) of the bus ATABUS2. Specifically, the signal lines from the host-side pads 68-1, 68-2, 68-3, . . . are connected with I/O cells 69-1, 69-2, 69-3, . . . (first to Nth host-side I/O cells in a broad sense) for the host-side I/F 70. The device-side I/O cells 59-1, 59-2, 59-3, . . . and the host-side I/O cells 69-1, 69-2, 69-3, . . . are input I/O cells, output I/O cells, input/output I/O cells, and the like.

In FIG. 6B, the switching elements 112-1, 112-2, 112-3, . . . included in the switching circuit 110 connect or disconnect the signal lines from the device-side pads 58-1, 58-2, 58-3, . . . and the signal lines from the host-side pads 68-1, 68-2, 68-3, . . . Specifically, the switching elements 112-1, 112-2, 112-3, . . . connect or disconnect the signal lines between the device-side pads 58-1, 58-2, 58-3, . . . and the device-side I/O cells 59-1, 59-2, 59-3, . . . and the signal lines between the host-side pads 68-1, 68-2, 68-3, . . . and the host-side I/O cells 69-1, 69-2, 69-3, . . .

According to the configuration shown in FIG. 6B, the signal lines of the bus ATABUS1 and the signal lines of the bus ATABUS2 can be connected along a short path. Therefore, the signal delay of the ATA signal can be reduced, whereby a decrease in the transfer rate in the hard wired mode can be minimized, or the transfer rate can be maintained without causing a decrease in the transfer rate. In particular, in the ATA data read operation, a data signal DD is enabled after a signal DIOR has been set to active. Therefore, the method which directly connects the device-side pads 58-1, 58-2, 58-3, . . . and the host-side pads 68-1, 68-2, 68-3, . . . , as shown in FIG. 6B, to prevent a signal delay is effective for preventing a decrease in the transfer rate.

Figure 7:
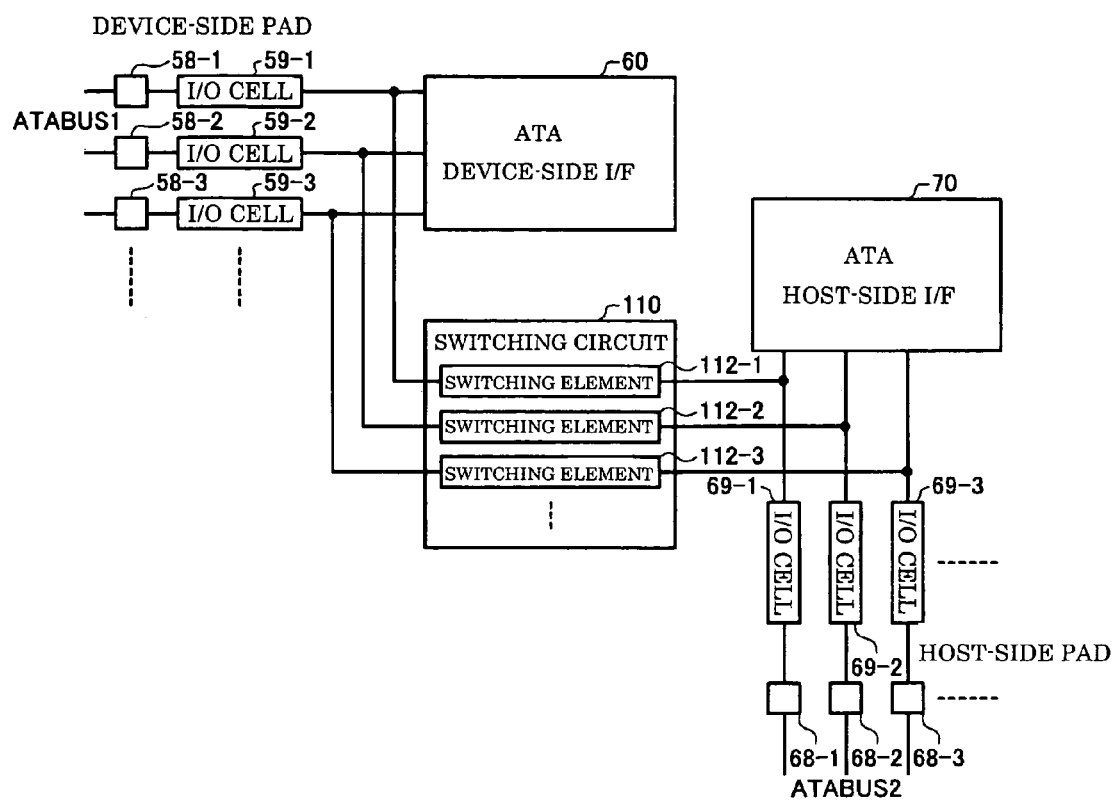
FIG. 7 is a configuration example of the switching circuit.

Note that the signal lines may be connected as illustrated in a modification shown in FIG. 7. In FIG. 7, the switching elements 112-1, 112-2, 112-3, . . . connect or disconnect the signal lines between the device-side I/O cells 59-1, 59-2, 59-3, . . . and the device-side I/F 60 and the signal lines between the host-side I/O cells 69-1, 69-2, 69-3, . . . and the host-side I/F 70. In the modification shown in FIG. 7, signal delays of the device-side I/O cells 59-1, 59-2, 59-3, . . . and the host-side I/O cells 69-1, 69-2, 69-3, . . . are added to the signal delays between the signal lines of the bus ATABUS1 and the signal lines of the bus ATABUS2. Therefore, the amount of signal delay is increased in comparison with FIG. 6B, whereby the transfer rate is decreased in the hard wired mode.

However, the configuration shown in FIG. 7 does not suffer to a large extent from migration of the signal lines connected with the switching elements 112-1, 112-2, 112-3, . . . or electrostatic breakdown of the switching elements 112-1, 112-2, 112-3, . . . Therefore, the configuration shown in FIG. 7 may also be employed when a decrease in the transfer rate does not pose a serious problem.

6. ATA Device-Side I/F and Host-Side I/F

Figure 8A:
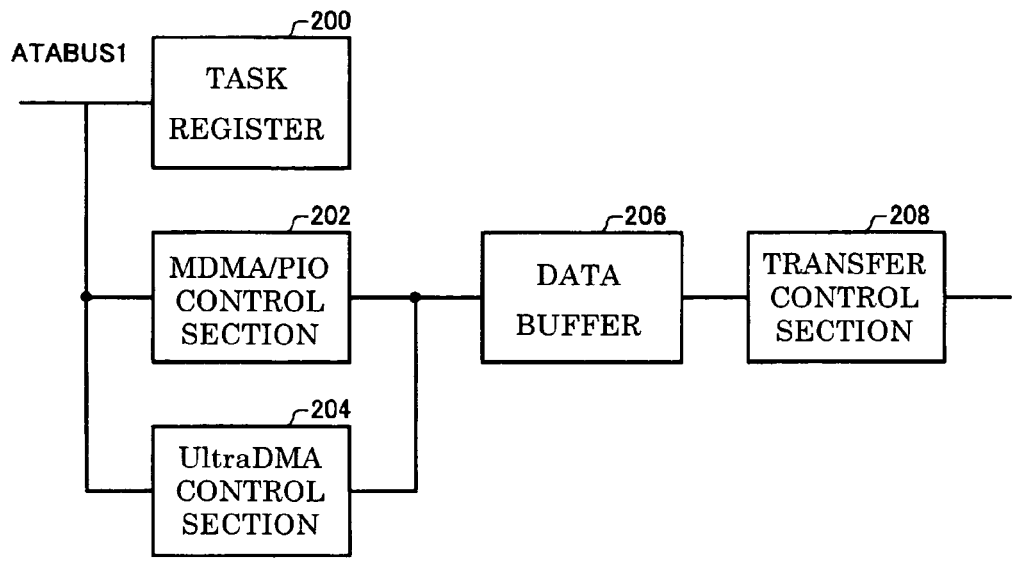
FIGS. 8A and 8B are configuration examples of an ATA device-side I/F and an ATA host-side I/F.

FIG. 8A shows a configuration example of the ATA device-side I/F 60. As shown in FIG. 8A, the device-side I/F 60 includes a task register 200, an MDMA/PIO control section 202, a UltraDMA control section 204, a data buffer 206, and a transfer control section 208.

The task register 200 is a register standardized in ATA (IDE), and includes a command block register as shown in FIG. 5 and a control block register. The command block register is a register used to issue the command or read the status. The control block register is a register used to control the device or read the substitute status.

The MDMA/PIO control section 202 performs device-side control processing of ATA multiword DMA transfer or PIO transfer. The UltraDMA control section 204 performs device-side control processing of ATA UltraDMA transfer. The data buffer 206 (FIFO) is a buffer for adjusting (buffering) the difference in the data transfer rate. The transfer control section 208 controls data transfer between the device-side I/F 60 and the circuit in the subsequent stage (transfer controller 100 or data buffer 102).

Figure 8B:
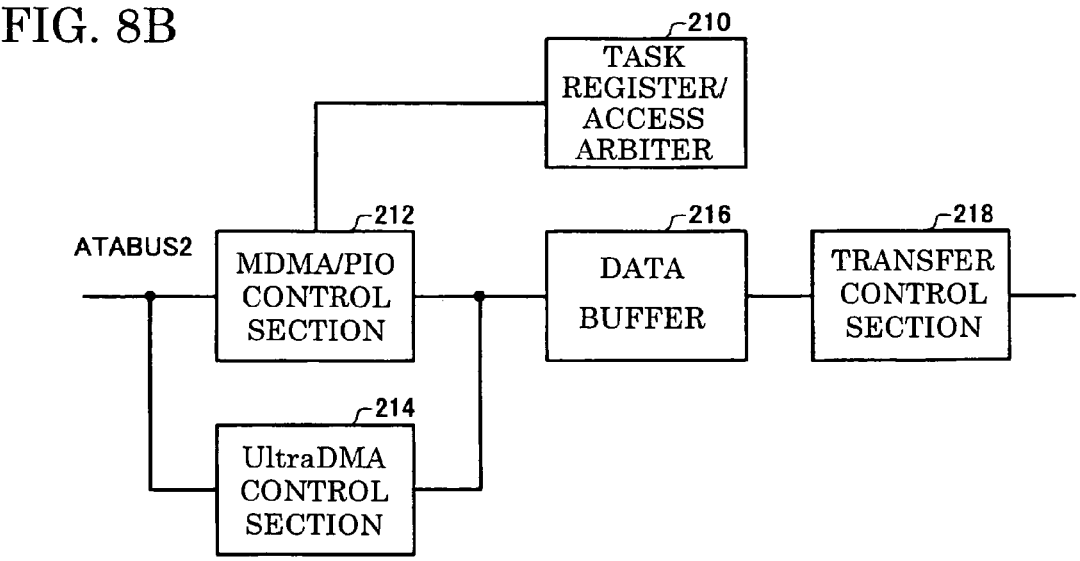

FIG. 8B shows a configuration example of the ATA host-side I/F 70. As shown in FIG. 8B, the host-side I/F 70 includes a task register/access arbiter 210, an MDMA/PIO control section 212, a UltraDMA control section 214, a data buffer 216, and a transfer control section 218.

The task register/access arbiter 210 performs access arbitration processing for the task register (200 in FIG. 8A) provided on the device side. The MDMA/PIO control section 212 performs host-side control processing of ATA multiword DMA transfer or PIO transfer. The UltraDMA control section 214 performs host-side control processing of ATA UltraDMA transfer. The data buffer 216 (FIFO) is a buffer for adjusting (buffering) the difference in the data transfer rate. The transfer control section 218 controls data transfer between the host-side I/F 70 and the circuit in the subsequent stage (transfer controller 100 or data buffer 102).

The ATA data transfer is described below using signal waveforms shown in FIGS. 9A to 10B. In FIGS. 9A to 10B, a signal CS[1:0] is a chip select signal used to access each ATA register. A signal DA[2:0] is an address signal for accessing data or a data port. Signals DMARQ and DMACK are signals used for DMA transfer. The device activates (asserts) the signal DMARQ when preparations for data transfer have been completed, and the host activates the signal DMACK in response to the signal DMARQ.

A signal DIOW (STOP) is a write signal used to write data in a register or a data port. The signal DIOW functions as a STOP signal during UltraDMA transfer. A signal DIOR (HDMARDY, HSTROBE) is a read signal used to read data from a register or a data port. The signal DIOR functions as an HDMARDY/HSTROBE signal during UltraDMA transfer. A signal IORDY (DDMARDY, DSTROBE) is used as a wait signal or the like when device-side data transfer preparations have not been completed. The signal IORDY functions as a DDMARDY/DSTROBE signal during UltraDMA transfer.

A signal INTRQ is a signal used for the device to request an interrupt to the host. When the host has read the content of the status register of the device-side task register after the signal INTRQ has become active, the device deactivates (negates) the signal INTRQ after a predetermined period of time has elapsed. The device can notify the host of completion of the command processing using the signal INTRQ.

Figure 9A:
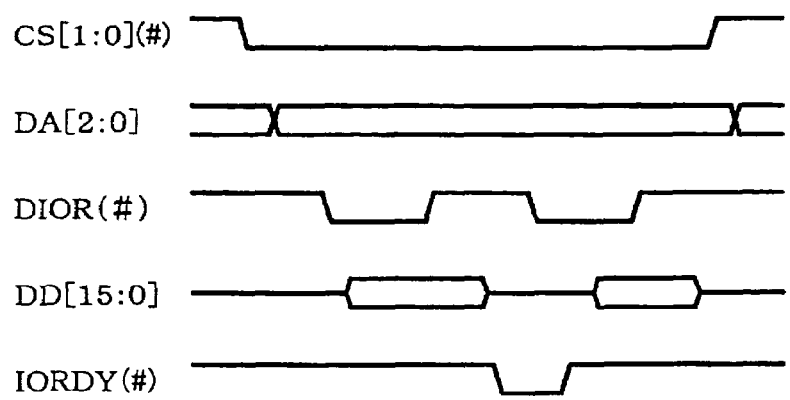
FIGS. 9A and 9B are signal waveform examples of ATA PIO transfer.
Figure 9B:
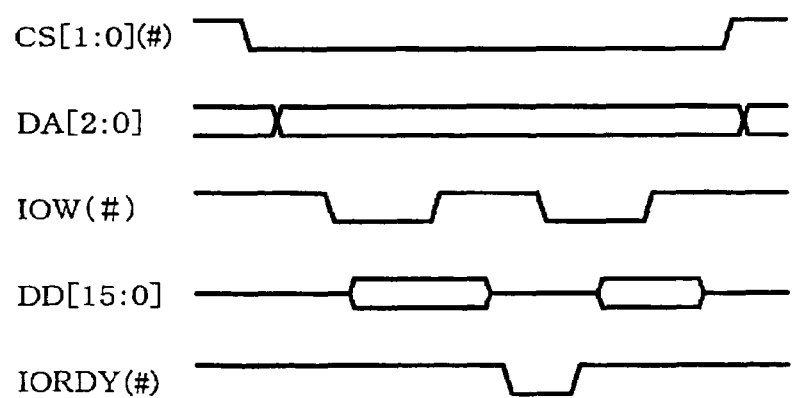

FIGS. 9A and 9B are signal waveform examples during PIO (Parallel I/O) read and PIO write. Data is read from the ATA status register by PIO read shown in FIG. 9A, and data is written into the command register by PIO write shown in FIG. 9B. For example, issuance of the vender specific command by the main CPU 30 may be realized by PIO write.

Figure 10A:
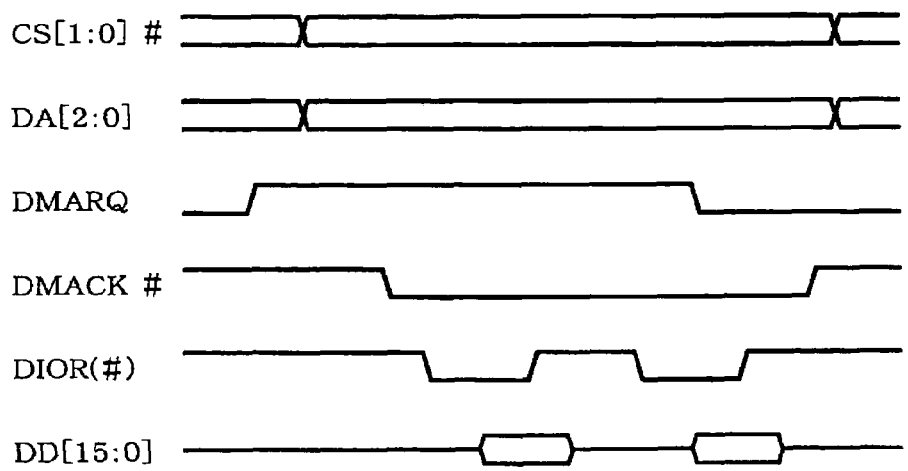
FIGS. 10A and 10B are signal waveform examples of ATA DMA transfer.
Figure 10B:
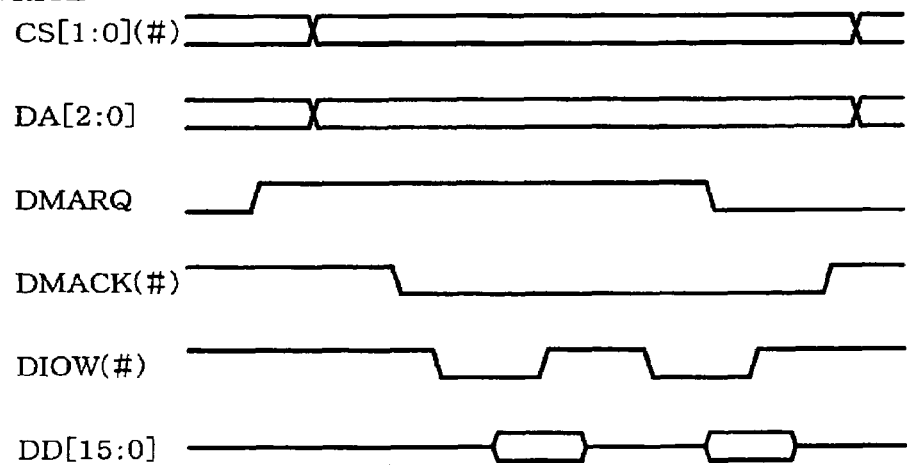

FIGS. 10A and 10B are signal waveform examples during DMA read and DMA write. The device activates the signal DMARQ when preparations for data transfer have been completed. The host activates the signal DMACK in response to the signal DMARQ to initiate DMA transfer. Then, DMA transfer of data DD[15:0] is performed using the signal DIOR (during read) or DIOW (during write).

7. USB I/F

In the USB standard, endpoints (EP0 to EP15) as shown in FIG. 11A are provided in the USB device. The USB standard defines control transfer, isochronous transfer, interrupt transfer, bulk transfer, and the like as the transfer types. Each transfer is made up of a series of transactions. As shown in FIG. 11B, a transaction is made up of a token packet, an optional data packet, and an optional handshake packet.

In an OUT transaction, the USB host issues an OUT token (token packet) to the USB device, as shown in FIG. 11C. Then, the USB host transmits OUT data (data packet) to the USB device. When the USB device has successfully received the OUT data, the USB device transmits an ACK packet (handshake packet) to the USB host. In an IN transaction, the USB host issues an IN token to the USB device, as shown in FIG. 11D. The USB device which has received the IN token transmits IN data to the USB host. When the USB host has successfully received the IN data, the USB host transmits an ACK packet to the USB device.

Note that "D←H" indicates that information is transferred from the USB host to the USB device, and "D→H" indicates that information is transferred from the USB device to the USB host.

The USB bulk-only transport protocol is described below. A large capacity storage device such as a hard disk drive or an optical disk drive is classified as a mass storage. The bulk-only transport protocol is standardized for the mass storage class.

In bulk-only transport, packets are transferred using bulk IN and bulk OUT endpoints. Specifically, 31-byte data called a Command Block Wrapper (CBW) is used as a command, and transferred using the bulk OUT endpoint. The bulk IN and bulk OUT endpoints are used for transfer data depending on the transfer direction. 13-byte data called a Command Status Wrapper (CSW) is used as the status for the command, and transferred using the bulk IN endpoint.

Figures 12A, 12B:
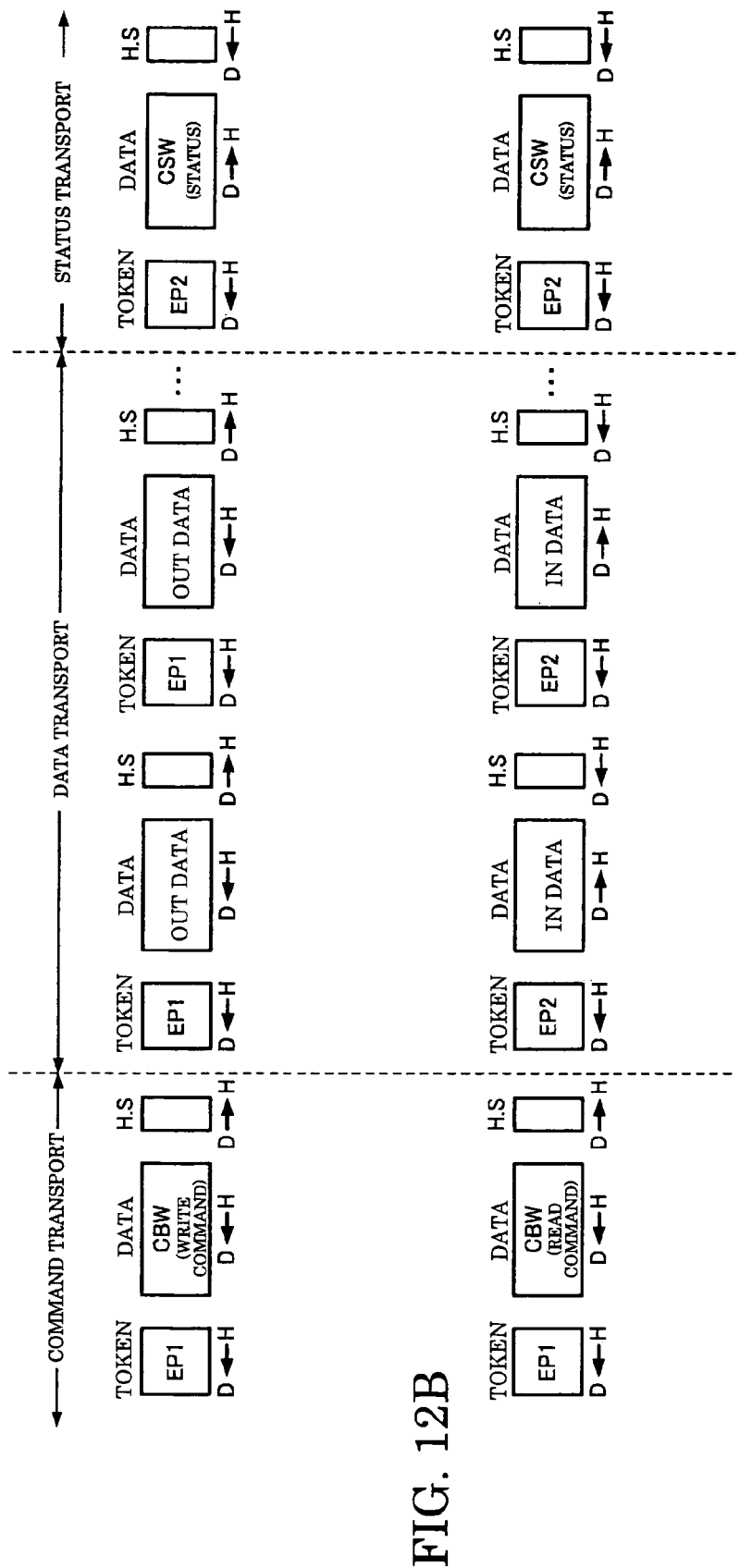
FIGS. 12A and 12B are diagrams illustrative of bulk-only transport.

Bulk-only transport transmission and reception processing (protocol control) is described below with reference to FIGS. 12A and 12B. As shown in FIG. 12A, when the USB host transmits data to the USB device, command transport is performed in which the USB host transmits the data CBW to the USB device. In more detail, the USB host transmits a token packet which designates the endpoint EP1 to the USB device, and then transmits the data CBW to the endpoint EP1 of the USB device. The data CBW includes a write command. The command transport is completed when an ACK handshake packet has been returned to the USB host from the USB device.

After the command transport has been completed, the processing transitions to data transport. In the data transport, the USB host transmits a token packet which designates the endpoint EP1 to the USB device, and then transmits OUT data to the endpoint EP1 of the USB device. One transaction is completed when an ACK handshake packet has been returned to the USB host from the USB device. Such a transaction is repeatedly performed. When data in an amount corresponding to the data length designated by the data CBW has been transmitted, the data transport is completed.

After the data transport has been completed, the processing transitions to status transport. In the status transport, the USB host transmits a token packet which designates the endpoint EP2 to the USB device. Then, the USB device transmits data CSW in the endpoint EP2 to the USB host. The status transport is completed when an ACK handshake packet has been returned to the USB device from the USB host.

When the USB host receives data from the USB device, the processing is performed as shown in FIG. 12B. FIG. 12B differs from FIG. 12A in that the data CBW of the command transport includes a read command and IN data is transferred in the data transport.

Figure 13:
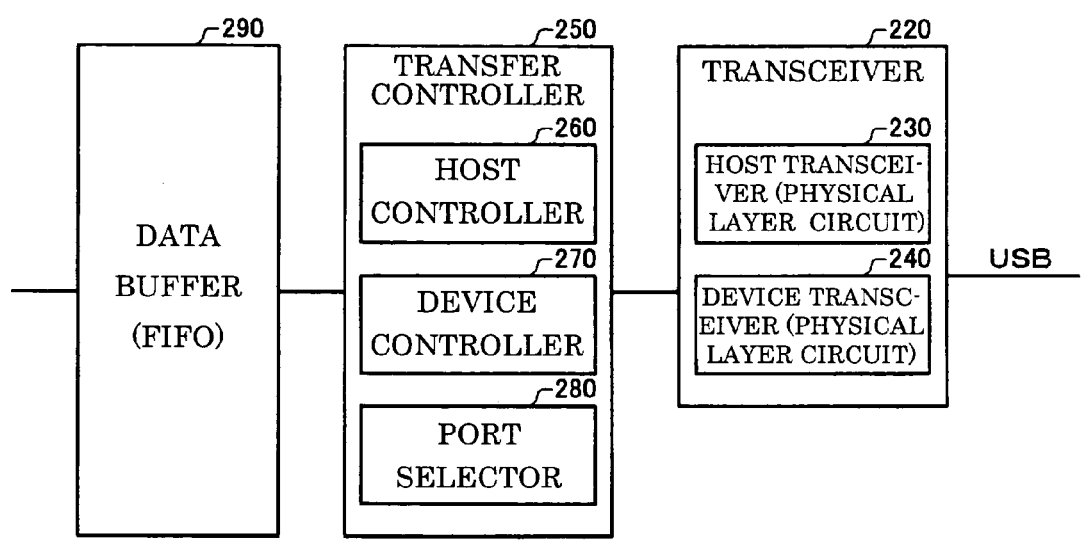
FIG. 13 is a configuration example of a USB I/F.

FIG. 13 shows a configuration example of the USB I/F 80. The USB I/F 80 includes a transceiver 220, a transfer controller 250, and a data buffer 290.

The transceiver 220 (dual transceiver) is a circuit which transmits and receives data through the USB bus (bus or serial bus in a broad sense) using differential signals (DP and DM), and includes a host transceiver 230 and a device transceiver 240.

The host transceiver 230 includes an analog front-end circuit (physical layer circuit) and a high-speed logic circuit, and supports the USB HS mode (480 Mbps), FS mode (12 Mbps), and LS mode (1.5 Mbps). The device transceiver 240 includes an analog front-end circuit (physical layer circuit) and a high-speed logic circuit, and supports the USB HS mode and FS mode. As the device transceiver 240, a circuit conforming to the USB 2.0 Transceiver Macrocell Interface (UTMI) specification may be used.

The transfer controller 250 is a controller for controlling data transfer through the USB bus. The transfer controller 250 controls data transfer of the transaction layer, link layer, and the like. The transfer controller 250 includes a host controller 260, a device controller 270, and a port selector 280. Note that the transfer controller 250 may have a configuration in which some of these blocks are omitted.

The host controller 260 (host serial interface engine) controls data transfer in a host mode. In more detail, the host controller 260 schedules (issues) transactions, manages transactions, and generates and analyzes packets. The host controller 260 also generates bus events such as suspend, resume, and reset. The host controller 260 also detects the bus connection/disconnection state and controls VBUS.

The device controller 270 (device serial interface engine) controls data transfer in a device mode. In more detail, the device controller 270 manages transactions and generates and analyzes packets. The device controller 270 also controls bus events such as suspend, resume, and reset.

The port selector 280 is a selector for selecting and enabling either the host mode or the device mode. For example, when the host mode has been selected using information set in the register or the like, the port selector 280 selects (enables) the host controller 260 and the host transceiver 230. On the other hand, when the device mode has been selected using information set in the register or the like, the port selector 280 selects (enables) the device controller 270 and the device transceiver 240.

The data buffer 290 (FIFO or packet buffer) is a buffer for temporarily storing (buffering) data (transmission data or reception data) transferred through the USB bus (serial bus). The data buffer 290 may be realized by a memory such as a RAM.

The functions of the transfer controller 250 and the data buffer 290 may be partially realized by the transfer controller 100 and the data buffer 102 shown in FIG. 2. Although FIG. 13 illustrates an example of the USB I/F 80 which performs the host operation and the device operation, the USB I/F 80 may perform only the device operation.

8. Detailed Processing

Figure 14:
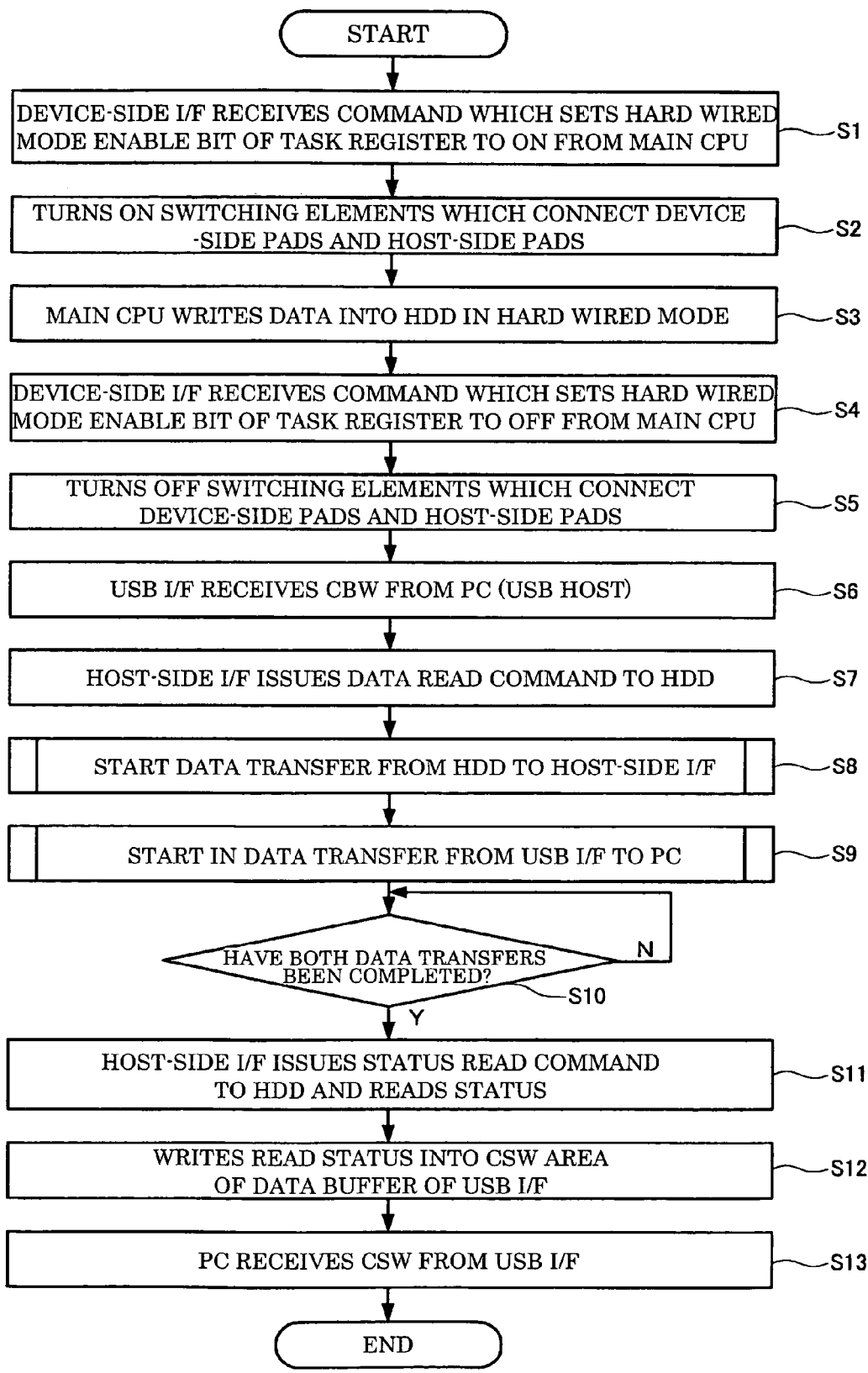
FIG. 14 is a flowchart illustrative of a detailed operation according to one embodiment of the invention.

The detailed processing according to this embodiment is described below with reference to flowcharts shown in FIGS. 14 and 15. FIG. 14 is a flowchart showing the detailed processing in the hard wired mode.

The ATA device-side I/F receives a command (vender specific command) which sets the hard wired mode enable bit of the task register to ON from the main CPU (step S1). Then, the processing section (switching signal generation section) turns ON the switching elements which connect the device-side pads and the host-side pads (step S2). The main CPU writes data into the HDD in the hard wired mode (step S3).

Then, the ATA device-side I/F receives a command which sets the hard wired mode enable bit of the task register to OFF from the main CPU (step S4). The processing section then turns OFF the switching elements which connect the device-side pads and the host-side pads (step S5).

The USB I/F then receives data CBW from the PC (USB host) (step S6). Specifically, when the user has moved or copied data stored in the HDD to the PC using the PC, the PC transmits the data CBW including a read command to the USB I/F. The ATA host-side I/F then issues a data read command to the HDD (step S7). Then, data transfer from the HDD to the host-side I/F is started (step S8). IN data transfer from the USB I/F to the PC is also started (step S9).

Whether or not the data transfers have been completed is then determined (step S11). When the data transfers have been completed, the host-side I/F issues a status read command to the HDD and reads the status (step S11). The host-side I/F writes the read status into the CSW area of the data buffer of the USB I/F (step S12). The PC receives data CSW from the USB I/F (step S13), whereby the transfer processing is completed.

FIG. 15 is a flowchart showing detailed data transfer processing using emulation. The ATA device-side I/F receives a command from the main CPU (step S21). Then, the processing section analyzes the received command, and the host-side I/F issues a command corresponding to the received command to the HDD (step S22). The command is issued by ATA PIO transfer. Data transfer from the main CPU to the device-side I/F is then started (step S23). Data transfer from the host-side I/F to the HDD is also started (step S24).

Whether or not the data transfers have been completed is then determined (step S25). When the data transfers have been completed, the host-side I/F issues a status read command to the HDD and reads the status (step S26). Then, the processing section analyzes the received status, and writes a status corresponding to the read status into the task register of the device-side I/F (step S27). The main CPU then reads the status from the task register (step S28).

Processing similar to the processing in the steps S6 to S13 in FIG. 14 is then performed (steps S29 to S36), whereby data written into the HDD is transferred to the PC.

Although only some embodiments of the invention are described in detail above, those skilled in the art would readily appreciate that many modifications are possible in the embodiments without materially departing from the novel teachings and advantages of the invention. Accordingly, such modifications are intended to be included within the scope of the invention. Any term (e.g. main CPU, HDD, or USB I/F) cited with a different term (e.g. ATA host, ATA device, or first interface) having a broader meaning or the same meaning at least once in the specification and the drawings can be replaced by the different term in any place in the specification and the drawings. The configurations and the operations of the data transfer control device and the electronic instrument are not limited to those described in the above embodiments. Various modifications and variations may be made. For example, the first ATA bus or the second ATA bus may be a Serial ATA or CE-ATA bus. The first to Kth interfaces may be interfaces other than USB, IEEE1394, and SD interfaces. Various interfaces including a physical layer circuit which at least either receives or transmits data may be employed as the first to Kth interfaces.

What is claimed is:

1. A data transfer control device comprising:
an ATA device-side interface that transfers data between the data transfer control device and an ATA host through a first ATA bus;
an ATA host-side interface that transfers data between the data transfer control device and an ATA device through a second ATA bus;
a switching circuit including first to Nth switching elements that connect or disconnect first to Nth signal lines of the first ATA bus and first to Nth signal lines of the second ATA bus;
a Universal Serial Bus (USB) interface that transfers data through a USB bus;
a transfer controller that controls data transfer among the ATA device-side interface, the ATA host-side interface, and the USB interface; and
a processing section that performs protocol control processing of USB,
when the processing section has determined that the data transfer control device has been set in a hard wired mode, the processing section turning ON the first to Nth switching elements to connect the first to Nth signal lines of the first ATA bus and the first to Nth signal lines of the second ATA bus, and
in the hard wired mode, data being transferred directly between the first ATA bus and the second ATA bus without passing through the ATA device-side interface and the ATA host-side interface.

2. The data transfer control device as defined in claim 1, comprising:
a register into which a command issued by the ATA host is written through the first ATA bus,
the transfer controller controlling so that data is transferred between two interfaces among the ATA device-side interface, the ATA host-side interface, and the USB interface based on the command written into the register.

3. The data transfer control device as defined in claim 2, the register being a task register included in the ATA device-side interface.

4. The data transfer control device as defined in claim 2, when a transfer control command assigned to a vender specific command has been written into the register, the transfer controller controlling so that data is transferred between two interfaces among the ATA device-side interface, the ATA host-side interface, and the USB interface based on the written vender specific transfer control command.

5. The data transfer control device as defined in claim 1, comprising an event notification section for notifying the ATA host of occurrence of an event.

6. The data transfer control device as defined in claim 5, the event notification section notifying the ATA host of an event that has occurred relating to the USB interface.

7. The data transfer control device as defined in claim 1, the transfer controller transferring data read from the ATA device through the ATA host-side interface to the USB interface, and the USB interface transmitting the transferred data to a host or a device connected with the USB bus through the USB bus.

8. The data transfer control device as defined in claim 1, comprising:
   an ATA second host-side interface that transfers data between the data transfer control device and an ATA device through a third ATA bus,
   the transfer controller controlling data transfer among the ATA device-side interface, the ATA host-side interface, the ATA second host-side interface, and the USB interface.

9. The data transfer control device as defined in claim 1, the USB interface including a physical layer circuit that at least either receives or transmits data through a serial bus.

10. The data transfer control device as defined in claim 1, comprising:
    first to Kth (K≧2) interfaces that transfer data through first to Kth buses,
    the transfer controller controlling data transfer among the ATA device-side interface, the ATA host-side interface, and the first to Kth interfaces.

11. An electronic instrument comprising:
    the data transfer control device as defined in claim 1;
    the ATA host connected with the data transfer control device through the first ATA bus; and
    the ATA device connected with the data transfer control device through the second ATA bus.

12. An electronic instrument comprising:
    the data transfer control device as defined in claim 2;
    the ATA host connected with the data transfer control device through the first ATA bus; and
    the ATA device connected with the data transfer control device through the second ATA bus.

13. An electronic instrument comprising:
    the data transfer control device as defined in claim 7;
    the ATA host connected with the data transfer control device through the first ATA bus; and
    the ATA device connected with the data transfer control device through the second ATA bus.

14. An electronic instrument comprising:
    the data transfer control device as defined in claim 8;
    the ATA host connected with the data transfer control device through the first ATA bus; and
    the ATA device connected with the data transfer control device through the second ATA bus.

15. The data transfer control device as defined in claim 1, when the USB interface receives read command from a USB host through the USB, the ATA host-side interface issuing a data read command to the ATA device and the transfer controller starting first data transfer from the ATA device to the ATA host-side interface and second data transfer from the USB interface to the USB host.

16. The data transfer control device as defined in claim 15, when the first data transfer and the second transfer are completed, the ATA host-side interface issuing a status read command to the ATA device, reading a status of the ATA device, and writing the status into a status area of a data buffer of the USB interface.

17. The data transfer control device as defined in claim 1, in the hard wired mode, the ATA device-side interface being set as a slave of ATA, and the ATA device being set as a master of ATA.

18. The data transfer control device as defined in claim 1, comprising:
    a register into which a first command issued by the ATA host is written through the first ATA bus, the register having a device select bit,
    when the ATA host sets the device select bit to a slave side and issues a mode setting command that enables the hard wired mode, the processing section referring to the device select bit, determining that the destination of the mode setting command is the processing section and turning ON the first to Nth switching elements to connect the first to Nth signal lines of the first ATA bus and the first to Nth signal lines of the second ATA bus.

19. The data transfer control device as defined in claim 18, when the ATA host sets the device select bit to a master side in the hard wired mode and transfers data, the ATA device referring to the device select bit, determining that the destination of the data is the ATA device and writing the data to a storage of the ATA device.

* * * * *